US009588333B2

(12) United States Patent
Sano et al.

(10) Patent No.: US 9,588,333 B2
(45) Date of Patent: Mar. 7, 2017

(54) WAVELENGTH TUNABLE INTERFERENCE FILTER, METHOD FOR MANUFACTURING WAVELENGTH TUNABLE INTERFERENCE FILTER, OPTICAL MODULE, AND ELECTRONIC APPARATUS

(71) Applicant: Seiko Epson Corporation, Tokyo (JP)

(72) Inventors: Akira Sano, Shiojiri (JP); Koji Kitahara, Ina (JP)

(73) Assignee: Seiko Epson Corporation (JP)

( * ) Notice: Subject to any disclaimer, the term of this patent is extended or adjusted under 35 U.S.C. 154(b) by 314 days.

(21) Appl. No.: 14/143,644

(22) Filed: Dec. 30, 2013

(65) Prior Publication Data

US 2014/0191116 A1    Jul. 10, 2014

(30) Foreign Application Priority Data

Jan. 7, 2013 (JP) ................................. 2013-000356

(51) Int. Cl.
| | |
|---|---|
| *H01J 40/14* | (2006.01) |
| *H01J 3/14* | (2006.01) |
| *H01J 5/02* | (2006.01) |
| *G02B 26/00* | (2006.01) |
| *G01J 3/26* | (2006.01) |

(52) U.S. Cl.
CPC .............. *G02B 26/001* (2013.01); *G01J 3/26* (2013.01); *Y10T 156/10* (2015.01); *Y10T 156/1056* (2015.01)

(58) Field of Classification Search
CPC .... G02B 5/284; G02B 6/29358; G02B 26/00; G02B 26/001; G01J 3/26

USPC ..... 250/216, 226, 208.1, 239; 359/237, 290, 359/295; 356/450–521; 156/99–109
See application file for complete search history.

(56) References Cited

U.S. PATENT DOCUMENTS

| | | | |
|---|---|---|---|
| 5,550,373 A | 8/1996 | Cole et al. | |
| 7,286,244 B2 * | 10/2007 | Murata | ............... G02B 26/001 356/519 |
| 7,573,547 B2 | 8/2009 | Palmateer et al. | |
| 2006/0076631 A1 | 4/2006 | Palmateer et al. | |
| 2006/0077147 A1 | 4/2006 | Palmateer et al. | |
| 2011/0252636 A1 | 10/2011 | Kitahara et al. | |

(Continued)

FOREIGN PATENT DOCUMENTS

| | | |
|---|---|---|
| JP | 02-257676 A | 10/1990 |
| JP | 10-511772 A | 11/1998 |

(Continued)

*Primary Examiner* — Pascal M Bui-Pho
(74) *Attorney, Agent, or Firm* — Harness, Dickey & Pierce, P.L.C.

(57) ABSTRACT

A wavelength tunable interference filter includes an electrostatic actuator that changes the dimension of a gap between a fixed reflection film and a movable reflection film, a fixed drawn electrode and a movable drawn electrode that are connected to the electrostatic actuator, and a third substrate having a top surface portion and a sidewall portion. An end surface of the sidewall portion is bonded to a first substrate so that a space surrounded by the top surface portion, the sidewall portion, and the first substrate is hermetically sealed. A second substrate and the electrostatic actuator are disposed in the space, and the fixed drawn electrode and the movable drawn electrode are disposed on the first substrate and extend both inside and outside the space.

18 Claims, 17 Drawing Sheets

(56) References Cited

U.S. PATENT DOCUMENTS

| | | | |
|---|---|---|---|
| 2012/0019827 A1* | 1/2012 | Shinto | G02B 5/0808 |
| | | | 356/416 |
| 2012/0127556 A1 | 5/2012 | Gally et al. | |
| 2012/0154915 A1* | 6/2012 | Hirokubo | G01J 3/26 |
| | | | 359/578 |
| 2012/0212824 A1* | 8/2012 | Sakurai | G02B 5/28 |
| | | | 359/579 |
| 2013/0038876 A1 | 2/2013 | Arakawa et al. | |
| 2013/0075596 A1 | 3/2013 | Matsuno et al. | |

FOREIGN PATENT DOCUMENTS

| | | | | |
|---|---|---|---|---|
| JP | 2005-309174 A | 11/2005 | | |
| JP | 2006-123160 A | 5/2006 | | |
| JP | 4535386 B2 | 9/2010 | | |
| JP | 2010-266876 A | 11/2010 | | |
| JP | 2011-227172 A | 11/2011 | | |
| JP | 2012-163912 | * 8/2012 | ............ | G02B 26/00 |
| JP | 2012-163912 A | 8/2012 | | |
| JP | 2012-185427 A | 9/2012 | | |
| JP | 2013-072981 A | 4/2013 | | |
| JP | 2013-117726 A | 6/2013 | | |

* cited by examiner

WAVELENGTH TUNABLE INTERFERENCE FILTER, METHOD FOR MANUFACTURING WAVELENGTH TUNABLE INTERFERENCE FILTER, OPTICAL MODULE, AND ELECTRONIC APPARATUS

BACKGROUND

1. Technical Field

The present invention relates to a wavelength tunable interference filter, a method for manufacturing the wavelength tunable interference filter, an optical module, and an electronic apparatus.

2. Related Art

There is a known wavelength tunable interference filter in which reflection films are disposed on the opposing surfaces of a pair of substrates so that the reflection films face each other and the dimension of the gap between the reflection films is changed to selectively extract light of a predetermined wavelength from incident light and transmit the extracted light.

In a wavelength tunable interference filter of this type, when the reflection films are made, for example, of Ag or an Ag alloy, the reflection films are likely to deteriorate due to adhesion of foreign matter, such as the air and water molecules in the air, on the reflection films.

In contrast, there is a wavelength tunable interference filter in which a space where the reflection films and electrodes are provided is hermetically sealed and the sealed space is exhausted into a vacuum (see JP-T-10-511772, for example).

In the filter detector described in JP-T-10-511772, one of a pair of substrates on which reflection films are formed is bonded to another substrate with the other one of the pair of substrates interposed therebetween, whereby a space in which the reflection films and electrodes that form an actuator are provided is exhausted into a vacuum and hermetically sealed.

In JP-T-10-511772 described above, in which each of the substrates is formed of a silicon substrate, a voltage is able to be applied to the electrodes via the silicon substrates. A silicon substrate, however, does not transmit light, for example, in the visible region. In a wavelength tunable interference filter that transmits light, for example, in the visible region, each substrate is made of glass or any other suitable nonconductive material, and the configuration described in JP-T-10-511772 undesirably does not allow application of a voltage to the electrodes in a hermetically sealed space.

SUMMARY

An advantage of some aspects of the invention is to provide a wavelength tunable interference filter that allows application of a voltage to electrodes in a hermetically sealed space, a method for manufacturing the wavelength tunable interference filter, an optical module, and an electronic apparatus.

A wavelength tunable interference filter according to an aspect of the invention includes a first substrate, a second substrate disposed so that the second substrate faces the first substrate, a first reflection film provided on the first substrate, the first reflection film reflecting part of incident light and transmitting part thereof, a second reflection film provided on the second substrate so that the second reflection film faces the first reflection film, the second reflection film reflecting part of incident light and transmitting part thereof, a gap changing section that changes the dimension of a gap between the first reflection film and the second reflection film, a wiring portion connected to the gap changing section, and a third substrate having a top surface portion and a sidewall portion extending from the top surface portion toward the first substrate and having a frame-like shape in a plan view viewed in a thickness direction of the top surface portion. An end surface of the sidewall portion of the third substrate that faces the first substrate is bonded to the first substrate so that a space surrounded by the top surface portion of the third substrate, the sidewall portion of the third substrate, and the first substrate is hermetically sealed. The second substrate and the gap changing section are disposed in the space. The wiring portion is disposed on the first substrate and is present both inside and outside the space.

According to the aspect of the invention, the wiring portion is disposed on the first substrate and extends both inside and outside the hermetically sealed space surrounded by the top surface portion, the sidewall portion, and the first substrate. As a result, the wiring portion extending out of the hermetically sealed space can apply a voltage to the gap changing section. Further, since the space described above can be hermetically sealed on a chip basis, unlike a configuration in which a wavelength tunable interference filter is accommodated (packaged) in an enclosure having an interior maintained in a hermetically sealed state, whereby the size of the wavelength tunable interference filter can be reduced.

In the wavelength tunable interference filter according to the aspect of the invention, it is preferable that the gap changing section includes a first electrode provided on the first substrate and a second electrode provided on the second substrate and disposed so that the second electrode faces the first electrode, that a connection electrode connected to the second electrode is provided on the second substrate, and that the wiring portion includes a first drawn electrode connected to the first electrode and a second drawn electrode connected to the connection electrode.

According to this configuration, a wiring line connected to the second electrode provided on the second substrate can be drawn by using the wiring portion provided on the first substrate. As a result, wiring lines for drawing purposes can all be placed on the first substrate, whereby the manufacturing cost can be lowered.

In the wavelength tunable interference filter according to the aspect of the invention, it is preferable that the wavelength tunable interference filter further includes a bonding member that is provided between an end surface of the sidewall portion of the third substrate and the first substrate and bonds the end surface to the first substrate, and the wiring portion passes through an area where the bonding member is disposed and extends both inside and outside the space.

According to this configuration, since the first substrate needs to undergo no special processing step of drawing wiring lines, the manufacturing cost can be lowered.

In the wavelength tunable interference filter according to the aspect of the invention, it is preferable that a groove is provided in the first substrate in a position facing the end surface of the sidewall portion, and that the wiring portion extends along the groove.

According to this configuration, in the portion where the end surface of the sidewall portion is bonded to the first substrate, a stepped portion formed between the surface of the wiring portion and the surface of the first substrate is smaller than a stepped portion in a case where no groove is formed, or the surface of the wiring portion is lower than the surface of the first substrate. The structure described above prevents the third substrate from being inclined and hence the end surface of the sidewall portion can be bonded to the first substrate with no gap therebetween, whereby the space described above can be more reliably hermetically sealed.

In the wavelength tunable interference filter according to the aspect of the invention, it is preferable that the bonding member is made of low melting glass (e.g., glass solder).

Since low melting glass fills a gap in a highly satisfactory manner, the configuration described above allows the end surface of the sidewall portion to be bonded to the first substrate with no gap therebetween even in the portion through which the wiring portion passes, whereby the space described above can be more reliably hermetically sealed.

In the wavelength tunable interference filter according to the aspect of the invention, it is preferable that the wiring portion passes through the first substrate and extends both inside and outside the space.

According to this configuration, since wiring lines are drawn from the interior of the space described above to the exterior thereof, the first substrate, for example, does not need to have an area where the first substrate is not covered with the third substrate, whereby the size of the first substrate can be reduced and hence the size of the wavelength tunable interference filter can be further reduced.

In the wavelength tunable interference filter according to the aspect of the invention, it is preferable that the end surface of the sidewall portion and the first substrate are bonded to each other in a metal bonding process via metal films provided on the end surface and the first substrate.

According to this configuration, the end surface of the sidewall portion and the first substrate can be more securely bonded to each other, whereby the space described above can be more reliably hermetically sealed. Further, since no gas producing material, such as an adhesive, is used, the vacuum state in the space described above can be maintained, whereas when the space described above is filled with an inert gas or any other predetermined gas, the space described above will not be contaminated with any other gas.

In the wavelength tunable interference filter according to the aspect of the invention, it is preferable that the end surface of the sidewall portion and the first substrate are bonded to each other by using low melting glass.

Since low melting glass fills a gap in a highly satisfactory manner, the configuration described above allows the end surface of the sidewall portion to be bonded to the first substrate with no gap therebetween, for example, even when the bonding interface has poor flatness, whereby the space described above can be more reliably hermetically sealed.

In the wavelength tunable interference filter according to the aspect of the invention, it is preferable that a through hole is provided in at least one of the first substrate and the third substrate, and that a sealing member that seals the through hole is provided.

According to this configuration, in the manufacturing stage, a gas in the space described above is removed through the through hole in a vacuum drawing process, and then the through hole is sealed with the sealing member. The space described above can thus be hermetically sealed with the vacuum state maintained. The step of bonding the first substrate and the third substrate to each other can be carried out in an atmospheric environment instead of in a vacuum chamber, whereby the manufacturing steps can be simplified. Further, for example, even when the sidewall portion is bonded to the first substrate with an adhesive, and the space described above is contaminated with gasses produced by the adhesive, the gasses can be readily removed.

In the wavelength tunable interference filter according to the aspect of the invention, it is preferable that the top surface portion and the sidewall portion are separate portions.

According to this configuration, the top surface portion and the sidewall portion can be separately formed. In this case, for example, the manufacturing period can be shortened, as compared with a case where the top surface portion and the sidewall portion are formed by etching a single substrate. Further, the surface flatness of the top surface portion can be increased, whereby light incident on the top surface portion is allowed to pass therethrough appropriately.

In the wavelength tunable interference filter according to the aspect of the invention, it is preferable that the top surface portion and the sidewall portion are made of the same material as the first substrate.

The top surface portion, the sidewall portion, and the first substrate may thermally expand due to heat generated in a manufacturing process, a change in environment temperature during use of the product, and other factors. In this case, when the degrees of thermal expansion of the top surface portion, the sidewall portion, and the first substrate differ from each other, induced stress may deform the top surface portion and the first substrate. When the first substrate, on which the first reflection film is formed, is deformed, the spectrometric resolution of the wavelength tunable interference filter may be lowered.

In contrast, according to the configuration described above, the coefficient of thermal expansion of the top surface portion and the sidewall portion can be equal to that of the first substrate, whereby deformation of the top surface portion and the first substrate can be suppressed. Light incident on the top surface portion or the first substrate can thus be appropriately separated for transmission of the separated light.

In the wavelength tunable interference filter according to the aspect of the invention, it is preferable that the top surface portion is made of borosilicate glass, and that the sidewall portion is made of silicon.

According to this configuration, the top surface portion and the sidewall portion can be bonded to each other in an anodic bonding process, whereby the top surface portion and the sidewall portion can be more securely bonded to each other. Moreover, when the first substrate is made of borosilicate glass, the sidewall portion can be bonded to the first substrate in an anodic bonding process, whereby the sidewall portion can be more securely bonded to the first substrate.

In the wavelength tunable interference filter according to the aspect of the invention, it is preferable that the top surface portion is made of glass, and that the sidewall portion is made of a metal.

According to this configuration, the sidewall portion can be bonded to the first substrate in a metal bonding process without separate formation of a metal film on the end surface of the sidewall portion, whereby the manufacturing steps can be simplified.

A method for manufacturing a wavelength tunable interference filter according to another aspect of the invention includes a first substrate formation step of forming a first reflection film that reflects part of incident light and transmits part thereof, a first electrode, and a wiring portion on a first substrate, a second substrate formation step of forming a second reflection film that reflects part of incident light and transmits part thereof and a second electrode on a second substrate, a third substrate formation step of forming a third substrate having a top surface portion and a sidewall portion having a frame-like shape in a plan view viewed in a thickness direction of the top surface portion, a gap formation step of disposing the first substrate and the second substrate so that the first reflection film and the second reflection film face each other and the first electrode and the second electrode face each other, and a bonding step of bonding the first substrate and the third substrate to each other, and the bonding step includes disposing the first substrate and the third substrate so that the second substrate is located in a space surrounded by the top surface portion, the sidewall portion, and the first substrate and the wiring portion is disposed both inside and outside the space and bonding an end surface of the sidewall portion that faces the first substrate to the first substrate to hermetically seal the space.

According to the aspect of the invention, the wiring portion provided on the first substrate, after undergoing the bonding step, extends both inside and outside the hermetically sealed space surrounded by the top surface portion, the sidewall portion, and the first substrate. As a result, the wiring portion extending out of the hermetically sealed space can apply a voltage to the first and second electrodes. Further, since the space described above can be hermetically sealed on a chip basis, unlike a configuration in which a wavelength tunable interference filter is accommodated in an enclosure having an interior maintained in a hermetically sealed state, whereby the size of the wavelength tunable interference filter can be reduced.

In the method for manufacturing a wavelength tunable interference filter according to the aspect of the invention, it is preferable that the bonding step includes forming a metal film on each of the end surface of the sidewall portion of the third substrate and the first substrate and bonding the formed metal films to each other to bond the end surface and the first substrate to each other.

According to this configuration, the end surface of the sidewall portion and the first substrate can be more securely bonded to each other, whereby the space described above can be more reliably hermetically sealed. Further, since no gas producing material, such as an adhesive, is used, the vacuum state in the space described above can be maintained, whereas when the space described above is filled with an inert gas or any other predetermined gas, the space described above will not be contaminated with any other gas.

In the method for manufacturing a wavelength tunable interference filter according to the aspect of the invention, it is preferable that the bonding step includes bonding the end surface of the sidewall portion of the third substrate and the first substrate to each other by using low melting glass.

Since low melting glass fills a gap in a highly satisfactory manner, the configuration described above allows the end surface of the sidewall portion to be bonded to the first substrate with no gap therebetween, for example, even when the bonding interface has poor flatness, whereby the space described above can be more reliably hermetically sealed.

In the method for manufacturing a wavelength tunable interference filter according to the aspect of the invention, it is preferable that the third substrate formation step includes forming a through hole in the third substrate, and that the bonding step includes bonding the end surface of the sidewall portion and the first substrate to each other, then removing a gas in the space through the through hole in a vacuum drawing process, and then sealing the through hole to hermetically seal the space.

According to this configuration, the step of bonding the first substrate and the third substrate to each other can be carried out in an atmospheric environment instead of in a vacuum chamber, whereby the manufacturing step can be simplified. Further, for example, even when the sidewall portion is bonded to the first substrate with an adhesive, and the space described above is contaminated with gasses produced by the adhesive, the gasses can be readily removed.

An optical module according to another aspect of the invention includes a first substrate, a second substrate disposed so that the second substrate faces the first substrate, a first reflection film provided on the first substrate, the first reflection film reflecting part of incident light and transmitting part thereof, a second reflection film provided on the second substrate so that the second reflection film faces the first reflection film, the second reflection film reflecting part of incident light and transmitting part thereof, a gap changing section that changes the dimension of a gap between the first reflection film and the second reflection film, a wiring portion connected to the gap changing section, a third substrate having a top surface portion and a sidewall portion extending from the top surface portion toward the first substrate and having a frame-like shape in a plan view viewed in a thickness direction of the top surface portion, and a detector that detects light of a wavelength selected based on interference of light that enters a space between the first reflection film and the second reflection film. An end surface of the sidewall portion of the third substrate that faces the first substrate is bonded to the first substrate so that a space surrounded by the top surface portion of the third substrate, the sidewall portion of the third substrate, and the first substrate is hermetically sealed. The second substrate and the gap changing section are disposed in the space. The wiring portion is disposed on the first substrate and extends both inside and outside the space.

According to the aspect of the invention, the space described above can be hermetically sealed on a chip basis as in the aspect of the invention described above, whereby the size of the optical module can be reduced.

An electronic apparatus according to another aspect of the invention includes a wavelength tunable interference filter including a first substrate, a second substrate disposed so that the second substrate faces the first substrate, a first reflection film provided on the first substrate, the first reflection film reflecting part of incident light and transmitting part thereof, a second reflection film provided on the second substrate so that the second reflection film faces the first reflection film, the second reflection film reflecting part of incident light and transmitting part thereof, a gap changing section that changes the dimension of a gap between the first reflection film and the second reflection film, a wiring portion connected to the gap changing section, and a third substrate having a top surface portion and a sidewall portion extending from the top surface portion toward the first substrate and having a frame-like shape in a plan view viewed in a thickness direction of the top surface portion and a control unit that controls the wavelength tunable interference filter. An end surface of the sidewall portion of the third substrate that faces the first substrate is bonded to the first substrate so that a space surrounded by the top surface portion of the third substrate, the sidewall portion of the third substrate, and the first substrate is hermetically sealed.

The second substrate and the gap changing section are disposed in the space. The wiring portion is disposed on the first substrate and extends both inside and outside the space.

According to the aspect of the invention, the space described above can be hermetically sealed on a chip basis as in the aspect of the invention described above, whereby the size of the wavelength tunable interference filter can be reduced. As a result, the size of the electronic apparatus in which the wavelength tunable interference filter is incorporated can be reduced.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

A first embodiment according to the invention will be described below with reference to the drawings.
Configuration of Spectrometric Measurement Apparatus FIG. 1 is a block diagram showing a schematic configuration of a spectrometric measurement apparatus of an embodiment according to the invention.

A spectrometric measurement apparatus 1 is an example of an electronic apparatus according to an embodiment of the invention and an apparatus that receives light under measurement reflected off an object X under measurement and measures the spectrum of the light under measurement. In the present embodiment, the light under measurement reflected off the object X under measurement is measured by way of example, whereas when a liquid crystal panel or any other light emitting object is used as the object X under measurement, light emitted from the light emitting object may be the light under measurement.

Figure 1:
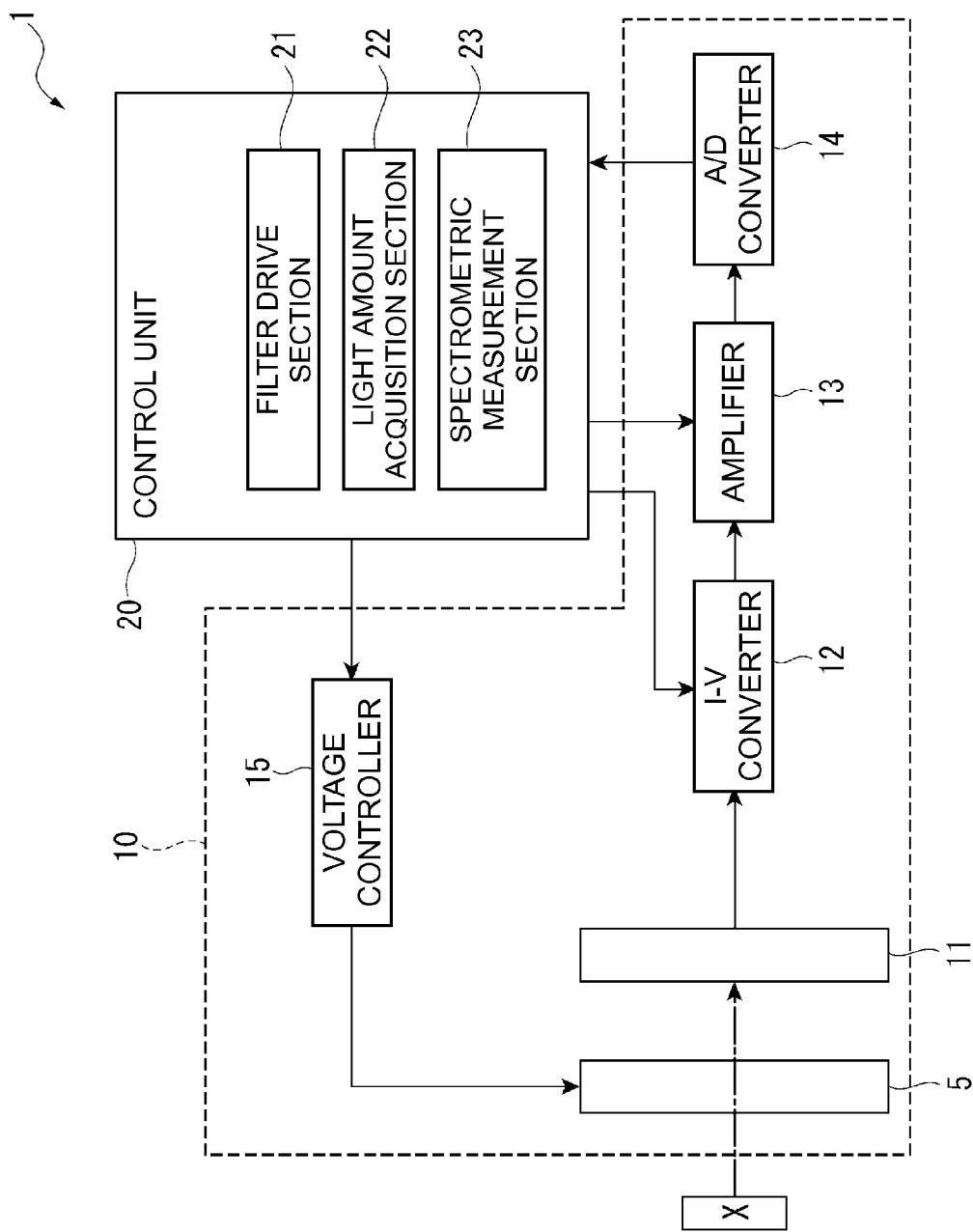
FIG. 1 is a block diagram showing a schematic configuration of a spectrometric measurement apparatus of a first embodiment according to the invention.

The spectrometric measurement apparatus 1 includes an optical module 10 and a control unit 20, as shown in FIG. 1.
Configuration of Optical Module The configuration of the optical module 10 will be described next below.

The optical module 10 includes a wavelength tunable interference filter 5, a detector 11, an I-V converter 12, an amplifier 13, an A/D converter 14, and a voltage controller 15, as shown in FIG. 1.

The detector 11 receives light having passed through the wavelength tunable interference filter 5 in the optical module 10 and outputs a detection signal (current) according to the optical intensity of the received light.

The I-V converter 12 converts the detection signal inputted from the detector 11 into a voltage value and outputs the voltage value to the amplifier 13.

The amplifier 13 amplifies the voltage according to the detection signal (detected voltage) inputted from the I-V converter 12.

Figure 2:
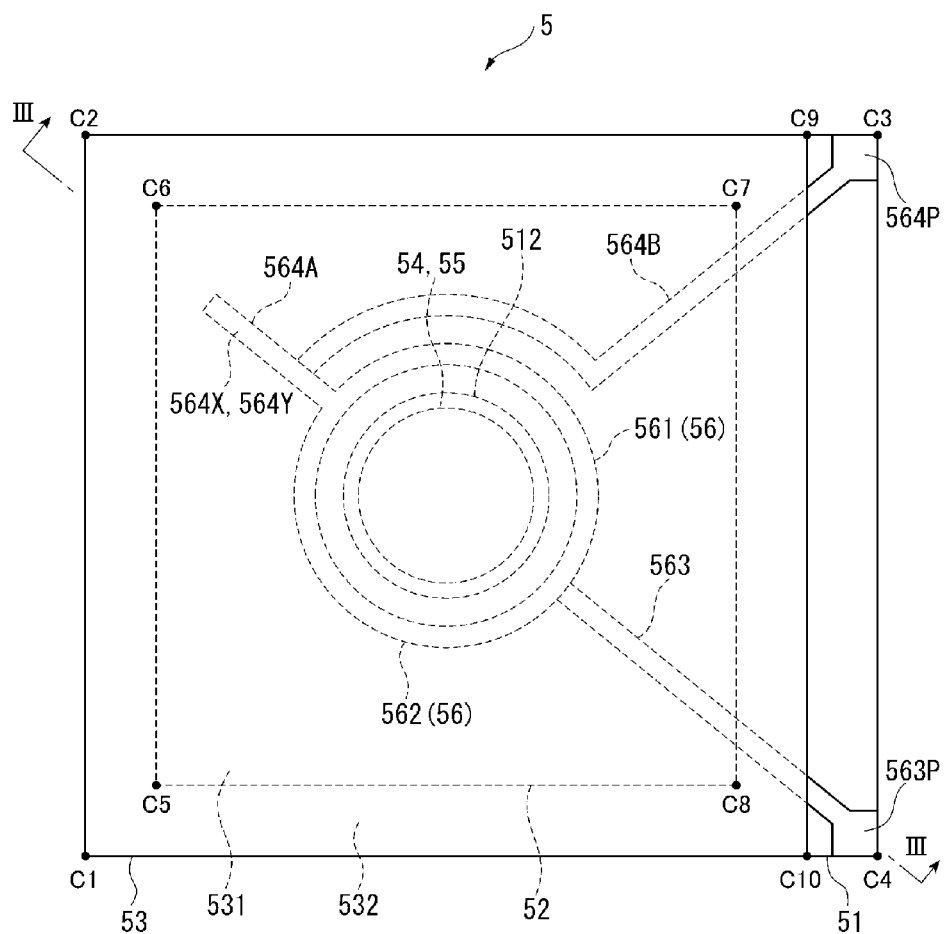
FIG. 2 is a plan view showing a schematic configuration of a wavelength tunable interference filter of the present embodiment.
Figure 3:
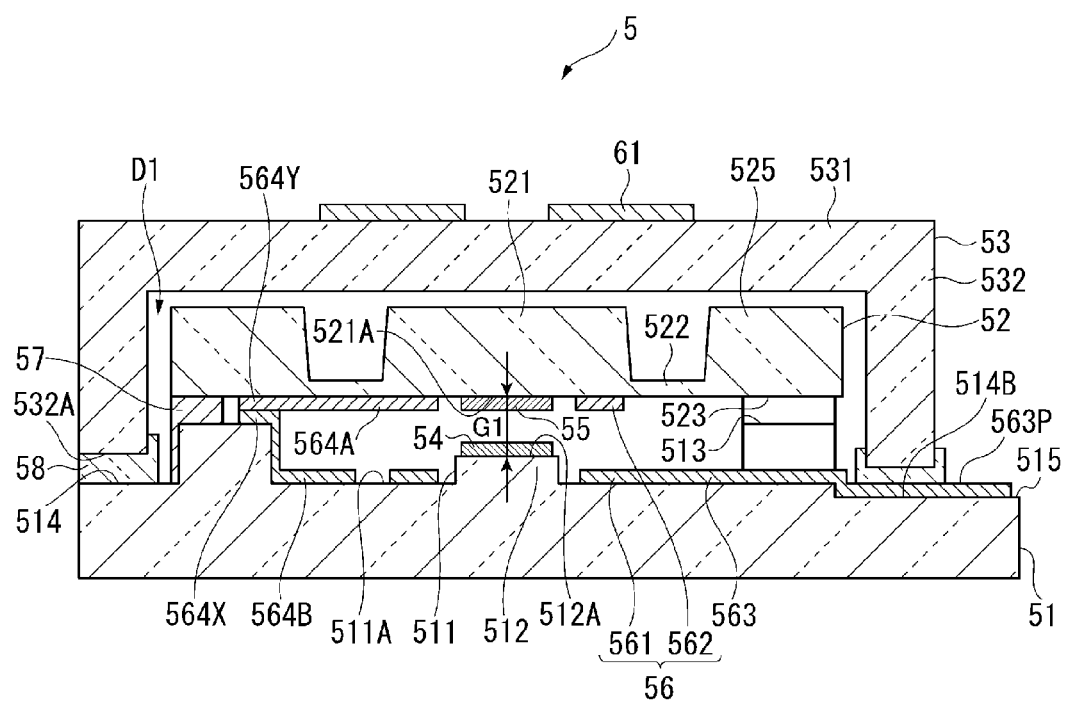
FIG. 3 is a cross-sectional view of the wavelength tunable interference filter taken along the line III-III in FIG. 2.

The A/D converter 14 converts the detected voltage (analog signal) inputted from the amplifier 13 into a digital signal and outputs the digital signal to the control unit 20.
Configuration of Wavelength Tunable Interference Filter FIG. 2 is a plan view showing a schematic configuration of the wavelength tunable interference filter 5. FIG. 3 is a cross-sectional view of the wavelength tunable interference filter 5 taken along the line III-III in FIG. 2.

The wavelength tunable interference filter 5 in the present embodiment is an example of what is called a Fabry-Perot etalon. The wavelength tunable interference filter 5 includes a first substrate 51 (fixed substrate), a second substrate 52 (movable substrate), and a third substrate 53, as shown in FIG. 2. The third substrate 53 has a top surface portion 531, which faces the first substrate 51 and the second substrate 52, and a sidewall portion 532, which extends from the top surface portion 531 toward the first substrate 51 and has a frame-like shape in a plan view when viewed in the thickness direction of the top surface portion 531.

The first substrate 51, the second substrate 52, and the third substrate 53 are made of a variety of types of glass (such as quartz and borosilicate glass). A bonding portion 513 of the first substrate 51 and a bonding portion 523 of the second substrate 52 are bonded to each other via a bonding film formed, for example, of a plasma polymerization film primarily made, for example, of siloxane so that the first substrate 51 and the second substrate 52 form an integrated unit. On the other hand, a bonding portion 514 of the first substrate 51 and an end surface 532A of the sidewall portion 532 of the third substrate 53 are bonded to each other via a bonding member 58 made of low melting glass so that the first substrate 51 and the third substrate 53 form an integrate unit.

A fixed reflection film 54 (first reflection film) is provided on the first substrate 51, and a movable reflection film 55 (second reflection film) is provided on the second substrate 52. The fixed reflection film 54 and the movable reflection film 55 face each other with an inter-reflection-film gap G1 therebetween. The wavelength tunable interference filter 5 is provided with an electrostatic actuator 56 (gap changing section), which is used to adjust the size of the inter-reflection-film gap G1 (dimension of gap). The electrostatic actuator 56 is formed of a fixed electrode 561 (first electrode) provided on the first substrate 51 and a movable electrode 562 (second electrode) provided on the second substrate 52. The fixed electrode 561 and the movable electrode 562 may be directly provided on surfaces of the first substrate 51 and the second substrate 52 respectively or may be provided thereon via other film members.

A plan view of the first substrate 51, the second substrate 52, and the third substrate 53 viewed in the thickness direction thereof is hereinafter referred to as a filter plan view in some cases.

Configuration of First Substrate

Figure 4:
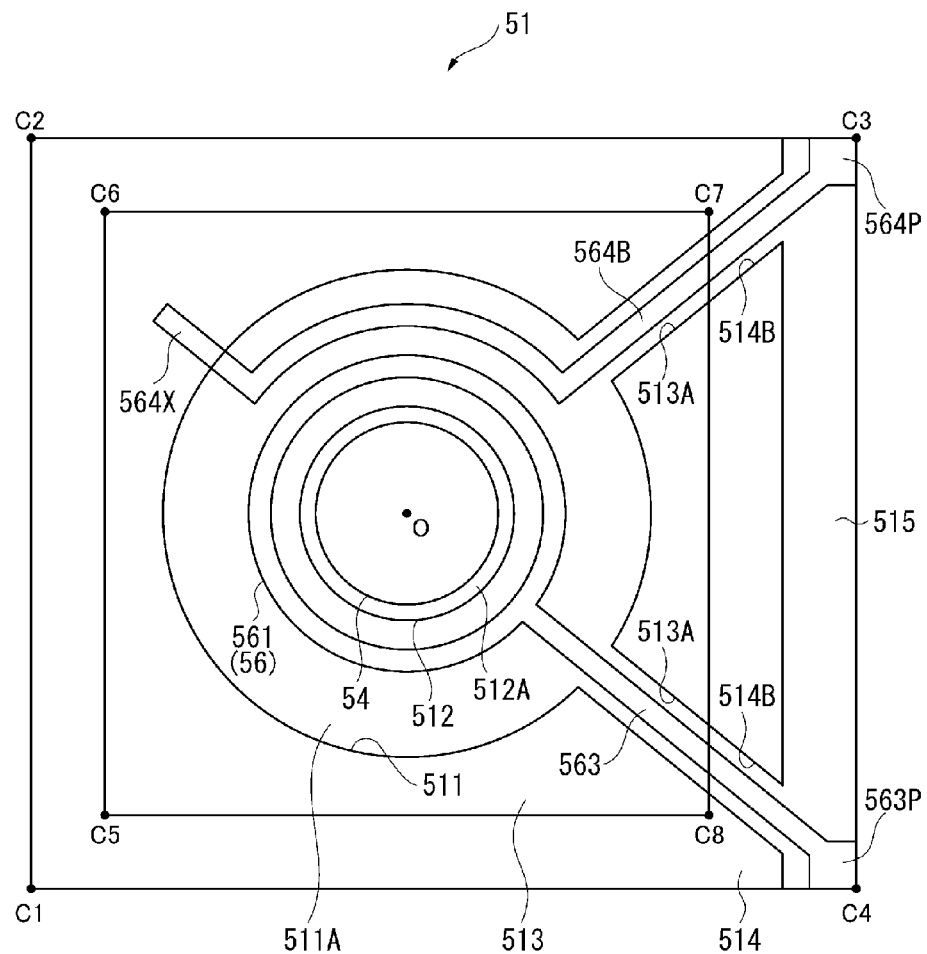
FIG. 4 is a plan view of a first substrate viewed from the side where a second substrate is present in the present embodiment.

FIG. 4 is a plan view of the first substrate 51 viewed from the side where the second substrate 52 is present.

The first substrate 51 is formed to be thicker than the second substrate 52 and is not hence bent due to an electrostatic attractive force produced by the electrostatic actuator 56 or internal stress induced in film members formed on the first substrate 51 (fixed reflection film 54, for example).

The first substrate 51 is a rectangular-plate-shaped member having vertices C1, C2, C3, and C4. The first substrate 51 has an electrode placement groove 511, a reflection film attachment portion 512, the bonding portion 514, and a pad attachment portion 515, which are formed, for example, in an etching process, as shown in FIGS. 3 and 4. Part of the surface of the first substrate 51 that faces the second substrate 52, specifically, the surface where the electrode placement groove 511, the reflection film attachment portion 512, the bonding portion 514, or the pad attachment portion 515 is not formed forms the bonding portion 513.

The reflection film attachment portion 512 has a reflection film attachment surface 512A, which faces the second substrate 52. The reflection film attachment surface 512A is a circular flat surface formed around a filter center point O, which substantially coincides with the center of the first substrate 51, in the filter plan view, and the reflection film attachment surface 512A is parallel to the surface of the second substrate 52 that faces the first substrate 51 (movable surface 521A). In the present embodiment, the circular reflection film attachment surface 512A is presented by way of example, and the reflection film attachment surface 512A is not necessarily circular and may have, for example, an octagonal shape, a hexagonal shape, or any other polygonal shape or an elliptical shape.

The electrode placement groove 511 is in the filter plan view disposed in an area outside the reflection film attachment portion 512 and formed so that it has an annular shape around the filter center point O. The surface of the electrode placement groove 511 that faces the second substrate 52 is farther from the second substrate 52 than the reflection film attachment surface 512A. The electrode placement groove 511 has an electrode placement surface 511A, which is parallel to the second substrate 52 and the reflection film attachment surface 512A.

The bonding portion 513 is disposed so that it surrounds the electrode placement groove 511 and has a rectangular outer peripheral edge having vertices C5, C6, C7, and C8 in the filter plan view. The bonding portion 513 is bonded to the bonding portion 523 of the second substrate 52 via the bonding film 57. Further, electrode drawing grooves 513A (see FIG. 4), which extend from the electrode placement groove 511 toward the vertices C3 and C4 of the first substrate 51, are formed in the bonding portion 513.

The bonding portion 514 is disposed so that it surrounds the bonding portion 513 and has a frame-like shape in the filter plan view. The bonding portion 514 is bonded to the end surface 532A of the sidewall portion 532 of the third substrate 53 via the bonding member 58. The bonding portion 514 is flush with the electrode attachment surface 511A and the bottom surfaces of the electrode drawing grooves 513A.

Further, electrode drawing grooves 514B (see FIG. 4), which are continuations of the electrode drawing grooves 513A and extend toward the vertices C3 and C4 of the first substrate 51, are formed in the bonding portion 514. The electrode drawing grooves 514B correspond to the groove according to an embodiment of the invention.

The pad attachment portion 515 is adjacent to the bonding portion 514 and has a rectangular shape having vertices that coincide with the vertices C3 and C4 of the first substrate 51 in the filter plan view. The pad attachment portion 515 is not covered with the third substrate 53. The pad attachment portion 515 is flush with the bottom surfaces of the electrode drawing grooves 514B.

The fixed electrode 561, which forms the electrostatic actuator 56, is mounted on the electrode attachment surface 511A. The fixed electrode 561 preferably has a substantially annular shape, more preferably an annular shape, formed around the filter center point O in the filter plan view. The annular shape used herein includes an annular shape with part thereof cut off, for example, a C-like shape.

A fixed drawn electrode 563 (first drawn electrode) is mounted on the first substrate 51 and extends from the outer peripheral edge of the fixed electrode 561 to the vertex C4 along the corresponding electrode drawing grooves 513A and 514B, which are oriented toward the vertex C4. The tip of the thus extending fixed drawn electrode 563 (portion located at vertex C4) forms a fixed electrode pad 563P, which is connected to the voltage controller 15. The fixed drawn electrode 563 corresponds to the wiring portion according to an embodiment of the invention.

The fixed electrode 561 may be made of any conductive material. Specifically, the fixed electrode 561 is made of a metal oxide that satisfactorily adheres to a metal film and an alloy film and is formed, for example, of an ITO (indium tin oxide) film or a laminate formed of a Cr layer and an Au layer.

An insulating film for ensuring insulation between the fixed electrode 561 and the movable electrode 562 may be layered on the fixed electrode 561.

The present embodiment has a configuration in which the single fixed electrode 561 is provided on the electrode attachment surface 511A but may instead have a configuration in which two concentric electrodes formed around the filter center point O are provided on the electrode attachment surface 511A (dual electrode configuration).

Further, a movable drawn electrode 564B (second drawn electrode) is provided in an area outside the fixed electrode 516 in the filter plan view. The movable drawn electrode 564B has one end portion extending along the outer side surface of the electrode placement groove 511 to the bonding portion 513 and the other end portion extending to the vertex C3 along the corresponding electrode drawing grooves 513A and 514B, which are oriented toward the vertex C3. The tip of the thus extending movable drawn electrode 564B (portion located at vertex C3) forms a movable electrode pad 564P, which is connected to the voltage controller 15. Further, the movable drawn electrode 564B located on the bonding portion 513 forms a connecting portion 564X, which is connected to a movable drawn electrode 564A (connection electrode) provided on the second substrate 52. The movable drawn electrode 564B corresponds to the wiring portion according to an embodiment of the invention.

Figure 5:
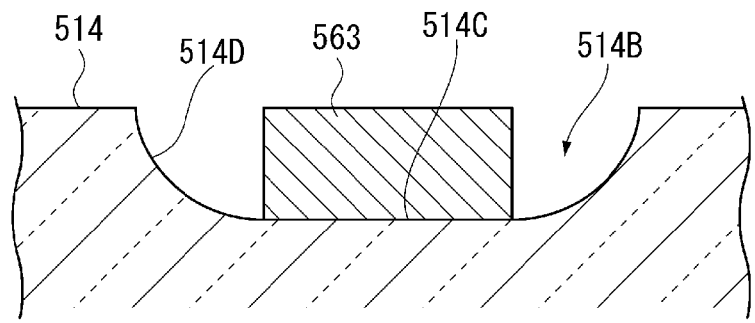
FIG. 5 is an enlarged view showing a cross section of an electrode drawing groove shown in FIG. 4.

FIG. 5 is an enlarged view showing a cross section of one of the electrode drawing grooves 514B shown in FIG. 4. FIG. 5 shows a cross section perpendicular to the direction in which the electrode drawing groove 514B extends.

FIG. 5 shows the electrode drawing groove 514B in which the fixed drawn electrode 563 is disposed, and the electrode drawing groove 514B in which the movable drawn electrode 564B is disposed has the same configuration.

Each of the electrode drawing grooves 514B has a bottom surface 514C, which is parallel to the bonding portion 514, and curved surfaces 514D, each of which connects the bottom surface 514C to the bonding portion 514. Each of the curved surfaces 514D is a side-etched surface formed when the first substrate 51 undergoes an etching process and so shaped that the curved surface is concave toward the fixed drawn electrode 563. The fixed drawn electrode 563 is disposed so that it covers the bottom surface 514C but does not cover the curved surfaces 514D.

The fixed reflection film 54 is mounted on the reflection film attachment portion 512, as shown in FIGS. 3 and 4. The fixed reflection film 54 is preferably a film having suitable reflective and transmissive characteristics over a wide wavelength region including the visible wavelength region. The thus defined fixed reflection film 54 is preferably a metal film made, for example, of Ag or an alloy film made, for example, of an AgC alloy. In the present embodiment, an AgC alloy film is used.

An antireflection film may be formed on a light incident surface of the first substrate 51 (surface on which no fixed reflection film 54 is provided) in a position corresponding to the fixed reflection film 54. The antireflection film can be formed by alternately stacking a low refractive index film and a high refractive index film, and the antireflection film decreases visible light reflectance of the surface of the first substrate 51 whereas increasing visible light transmittance thereof.

Configuration of Second Substrate

Figure 6:
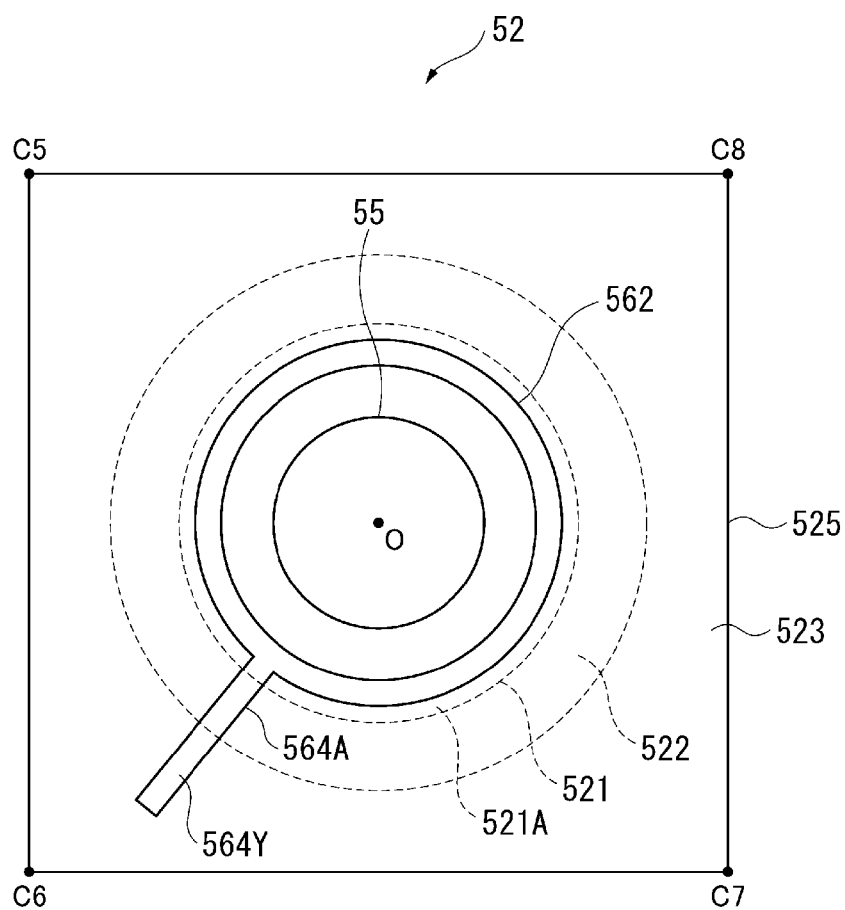
FIG. 6 is a plan view of the second substrate viewed from the side where the first substrate is present in the present embodiment.

FIG. 6 is a plan view of the second substrate 52 viewed from the side where the first substrate 51 is present.

The second substrate 52 is a rectangular-plate-shaped member having vertices C5, C6, C7, and C8. The second substrate 52 has a circular movable portion 521, which is formed around the filter center point O, a holding portion 522, which is coaxial with the movable portion 521 and holds the movable portion 521, and a substrate outer peripheral portion 525, which is provided in an area outside the holding portion 522, in the filter plan view, as shown in FIGS. 3 and 6.

An antireflection film may be formed on the surface of the movable portion 521 that faces away from the first substrate 51, as in the case of the first substrate 51.

The movable portion 521 is formed to be thicker than the holding portion 522. In the present embodiment, for example, the movable portion 521 is as thick as the second substrate 52 (substrate outer peripheral portion 525). The movable portion 521 is formed so that it has a diameter greater than at least the diameter of the outer peripheral edge of the reflection film attachment surface 512A in the filter plan view.

The movable reflection film 55 and the movable electrode 562 are disposed on the movable portion 521, specifically, a movable surface 521A that faces the first substrate 51.

The movable reflection film 55 is made of the same material as that of the fixed reflection film 54 (AgC alloy film in the present embodiment).

The movable electrode 562 is disposed in an area outside the movable reflection film 55 and facing the fixed electrode 561 in the filter plan view, as shown in FIGS. 2, 3, and 6. The movable electrode 562 only needs to be conductive and can, for example, be an ITO film or a laminate formed by laminating an Au layer on a Cr layer, as in the case of the fixed electrode 561.

Further, the movable drawn electrode 564A is mounted on the second substrate 52 and extends from the outer peripheral edge of the movable electrode 562 toward the connecting portion 564X of the movable drawn electrode 564B. The tip of the thus extending movable drawn electrode 564A forms a connecting portion 564Y, which is connected to the connecting portion 564X.

The holding portion 522 is a diaphragm that surrounds the movable portion 521 and is thinner than the movable portion 521. The thus configured holding portion 522 is more readily bent than the movable portion 521 and can hence displace the movable portion 521 toward the first substrate 51 in response to a small amount of electrostatic attractive force.

In the present embodiment, the diaphragm-shaped holding portion 522 is presented by way of example, and the holding portion 522 is not limited to a diaphragm. For example, beam-shaped holding portions disposed at equal angular intervals may be provided around the filter center point O.

The substrate outer peripheral portion 525 is disposed in an area outside the holding portion 522 in the filter plan view, as described above. The bonding portion 523, which faces the bonding portion 513, is provided on the surface of the substrate outer peripheral portion 525 that faces the first substrate 51, and the bonding portion 523 is bonded to the bonding portion 513 via the bonding film 57.

Configuration of Third Substrate

As shown in FIGS. 2 and 3, the third substrate 53 is formed of the top surface portion 531, which faces the first substrate 51 and has a rectangular-plate-like shape having vertices C1, C2, C9, and C10, and the sidewall portion 532, which is integrated with the top surface portion 531, extends from the top surface portion 531 toward the first substrate 51, and surrounds the second substrate 52 in the filter plan view.

The end surface 532A of the sidewall portion 532, which faces the first substrate 51, is bonded to the bonding portion 514 of the first substrate 51 via the bonding member 58. Therefore, in the filter plan view, the pad attachment portion 515 provided in the area outside the bonding portion 514 is exposed to the exterior of the structure, and the fixed electrode pad 563P and the movable electrode pad 564P provided on the pad attachment portion 515 are exposed to the exterior of the structure.

The electrode drawing grooves 514B are filled with the bonding member 58, which is in intimate contact with the movable drawn electrode 546B and the fixed drawn electrode 563 disposed in the electrode drawing grooves 514B.

The bonding structure allows a space D1 surrounded by the top surface portion 531, the sidewall portion 532, and the first substrate 51 to be hermetically sealed. The space D1 is assumed to be a substantially vacuum space in the present embodiment, but the space D1 may instead be filled with an inert gas.

The space D1 accommodates the second substrate 52. That is, the fixed reflection film 54, the movable reflection film 55, the fixed electrode 561, the movable electrode 562, and the movable drawn electrode 564A are located in the space D1. Further, the movable drawn electrode 564B and the fixed drawn electrode 563 pass through the bonding member 58 and are disposed both inside and outside the space D1.

An aperture 61 is provided on the surface of the top surface portion 531 that faces away from the first substrate 51. The aperture 61 is formed of a Cr film. The aperture 61 has an opening in a position facing the fixed reflection film 54 and the movable reflection film 55 in the filter plan view. The opening adjusts the amount of light incident on the top surface portion 531.

Configuration of Voltage Controller

The voltage controller 15 is connected to the fixed drawn electrode 563 (fixed electrode pad 563P) and the movable drawn electrode 564B (movable electrode pad 564P) in the wavelength tunable interference filter 5.

The voltage controller 15, when it receives a voltage instruction signal corresponding to the wavelength under measurement from the control unit 20, applies a corresponding voltage between the fixed drawn electrode 563 and the movable drawn electrode 564B. As a result, the electrostatic actuator 56 in the wavelength tunable interference filter 5 produces an electrostatic attractive force according to the applied voltage (between the fixed electrode 561 and the movable electrode 562), and the electrostatic attractive force displaces the movable portion 521 toward the first substrate 51, resulting in a change in the size of the inter-reflection-film gap G1.

Configuration of Control Unit

The control unit 20 is, for example, a combination of a CPU, a memory, and other components and controls the overall action of the spectrometric measurement apparatus 1. The control unit 20 includes a filter drive section 21, a light amount acquisition section 22, and a spectrometric measurement section 23, as shown in FIG. 1.

The control unit 20 further includes a storage section (not shown) that stores a variety of data. The storage section specifically stores V-λ data according to which the electrostatic actuator 56 is controlled.

The recorded V-λ data contains a voltage and a peak wavelength of light that passes through the wavelength tunable interference filter 5 when the voltage is applied to the electrostatic actuator 56.

The filter drive section 21 sets a target wavelength of light to be extracted through the wavelength tunable interference filter 5 and reads a target voltage value corresponding to the set target wavelength from the V-λ data stored in the storage section. The filter drive section 21 then outputs a control signal to the voltage controller 15 to cause it to apply the read target voltage value. As a result, the voltage controller 15 applies a voltage having the target voltage value to the electrostatic actuator 56.

The light amount acquisition section 22 acquires the amount of light of the target wavelength having passed through the wavelength tunable interference filter 5 based on the amount of light acquired with the detector 11.

The spectrometric measurement section 23 measures spectral characteristics of the light under measurement based on the amount of light acquired by the light amount acquisition section 22.

A spectrometric measurement method used in the spectrometric measurement section 23 is, for example, a method for measuring an optical spectrum by using the amount of light of a wavelength under measurement detected with the detector 11 as the amount of light of the wavelength under measurement or a method for estimating an optical spectrum based on the amounts of light of a plurality of wavelengths under measurement.

An example of the method for estimating an optical spectrum includes producing a measured spectrum matrix in which the amounts of light of a plurality of wavelengths under measurement are the matrix elements and operating a predetermined conversion matrix on the measured spectrum matrix to estimate an optical spectrum of the light under measurement. In this case, a plurality of sample light fluxes having known optical spectra are measured by using the spectrometric measurement apparatus 1, and the conversion matrix is so set that a matrix produced by operating the conversion matrix on a measured spectrum matrix produced based on the measured amounts of light minimally deviates from the known optical spectra.

Method for Manufacturing Wavelength Tunable Interference Filter

A method for manufacturing the wavelength tunable interference filter 5 described above will be described next with reference to the drawings.

Figure 7:
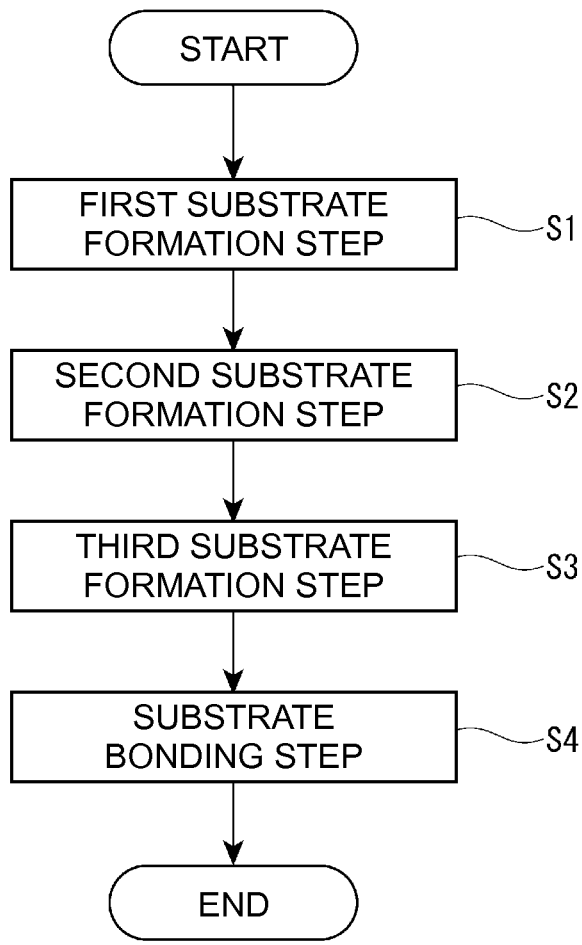
FIG. 7 is a flowchart showing steps of manufacturing the wavelength tunable interference filter according to the present embodiment.

FIG. 7 is a flowchart showing steps of manufacturing the wavelength tunable interference filter 5.

To manufacture the wavelength tunable interference filter 5, a first glass substrate M1 for forming the first substrate 51, a second glass substrate M2 for forming the second substrate 52, and a third glass substrate for forming the third substrate 53 are first provided, and a first substrate formation step S1, a second substrate formation step S2, and a third substrate formation step S3 are carried out. A substrate bonding step S4 is then carried out to bond the first glass substrate M1 processed in the first substrate formation step S1 and the second glass substrate M2 processed in the second substrate formation step S2 to each other. After the resultant structure is cut on a chip basis, the third substrate 53 processed in the third substrate formation step S3 is bonded to each chip to form the wavelength tunable interference filter 5.

The steps S1 to S4 will be described below with reference to the drawings.

First substrate formation step FIGS. 8A to 8D show a variety of states of the first glass substrate M1 in the first substrate formation step S1.

Figure 8A:
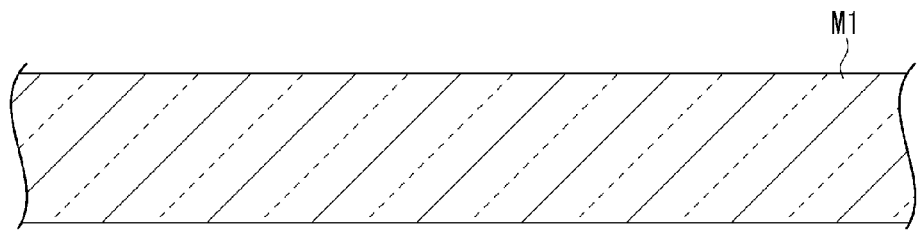
FIGS. 8A to 8D show a variety of states of a first glass substrate in a first substrate formation step shown in FIG. 7.

In the first substrate formation step S1, both surfaces of the first glass substrate M1 (1 mm thick, for example), based on which the first substrate 51 is manufactured, are first polished with precision until a surface roughness Ra of 1 nm or smaller is achieved, as shown in FIG. 8A.

Figure 8B:
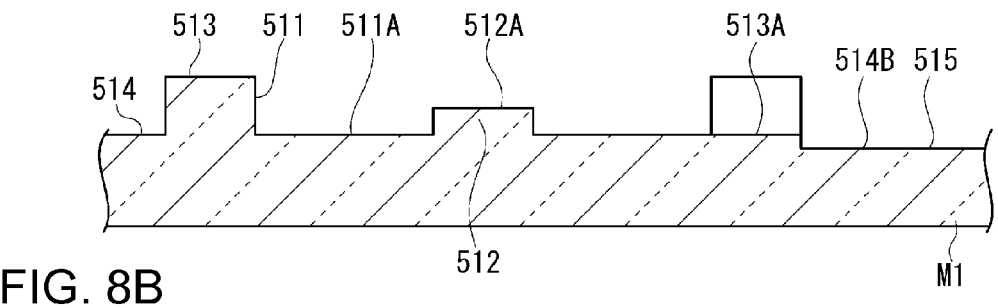

The substrate surface of the first glass substrate M1 is then processed in an etching process, as shown in FIG. 8B.

Specifically, a resist pattern having been patterned based on a photolithography method is used as a mask to repeatedly perform, for example, fluorinated-acid-based (such as BHF-based) wet etching on the first glass substrate M1. The etching is first so performed that the electrode placement groove 511, the reflection film attachment portion 512, the bonding portion 514, the pad attachment portion 515, and the electrode drawing grooves 513A and 514B are formed to the height of the reflection film attachment surface 512A. The etching is then so performed that the electrode placement groove 511, the bonding portion 514, the pad attachment portion 515, and the electrode drawing grooves 513A and 514B are formed to the height of the electrode attachment surface 511A. The etching is finally performed by the amount corresponding to the thickness of the fixed drawn electrode 563 and the movable drawn electrode 564B to form the pad attachment portion 515 and the electrode drawing groove 514B. Since the etching, which proceeds isotropically, causes side etching by the same dimension as the depth dimension, the side surfaces of each of the electrode drawing grooves 514B have the curved surfaces 514D, as shown in FIG. 5.

The non-etched surface of the first glass substrate M1 forms the bonding portion 513. The first glass substrate M1 having the complete substrate shape of the first substrate 51 is thus formed.

In the present embodiment, a plurality of first substrates 51 are formed from the single first glass substrate M1. To this end, the etching in the step described above is so performed on the first glass substrate M1 that a plurality of first substrates 51 are manufactured in the form of an array in which they are arranged side by side.

Figure 8C:
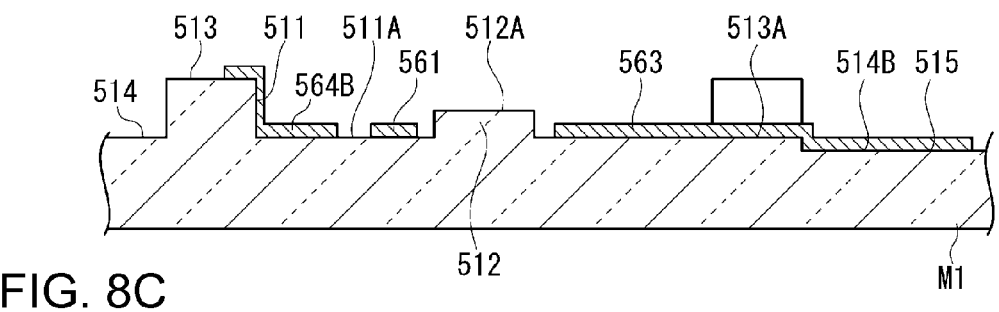

An electrode material (ITO, for example) from which the fixed electrode 561, the fixed drawn electrode 563, and the movable drawn electrode 564B are formed is next deposited on the first glass substrate M1, for example, in an evaporation or sputtering process. A resist is then applied onto the first glass substrate M1 and patterned in accordance with the shapes of the fixed electrode 561, the fixed drawn electrode 563, and the movable drawn electrode 564B in a photolithography process. Etching using an ITO etchant (mixture of hydrochloric acid, nitric acid, and water, for example) is then performed followed by removal of the resist. The fixed electrode 561, the fixed drawn electrode 563, and the movable drawn electrode 564B are thus formed, as shown in FIG. 8C.

To form an insulating film on the fixed electrode 561, the formation of the fixed electrode 561 is followed by deposition of $SiO_2$ to a thickness of about 100 nm or any other suitable value over the entire surface of the first substrate 51 that faces the second substrate 52, for example, in a plasma CVD process. The $SiO_2$ on the fixed electrode pad 563P is then removed, for example, in a dry etching process.

Figure 8D:
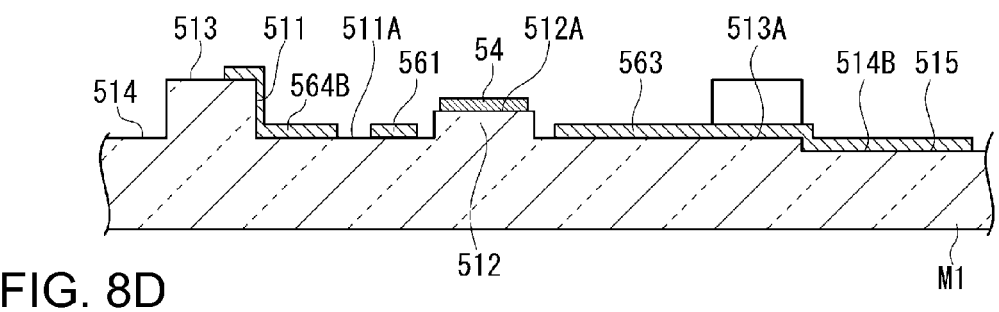

The fixed reflection film 54 is then formed on the reflection film attachment surface 512A. Specifically, a film layer for forming the fixed reflection film 54 is formed in a vacuum evaporation or sputtering process on the surface of the first glass substrate M1 where the electrode placement groove 511 and the reflection film attachment portion 512 have been formed. A resist pattern having been patterned in a photolithography process is then used as a mask to etch the film layer to form the fixed reflection film 54, as shown in FIG. 8D.

The first glass substrate M1 on which a plurality of first substrates 51 are arranged in the form of an array is thus formed.

Second Substrate Formation Step

The second substrate formation step S2 will be described next. FIGS. 9A to 9D show a variety of states of the second glass substrate M2 in the second substrate formation step S2.

Figure 9A:
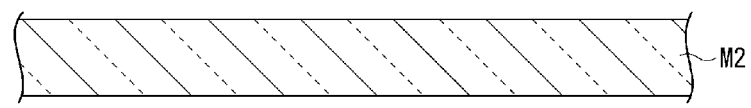
FIGS. 9A to 9D show a variety of states of a second glass substrate in a second substrate formation step shown in FIG. 7.

In the second substrate formation step S2, both surfaces of the second glass substrate M2 (0.5 mm thick, for example) are first polished with precision until a surface roughness Ra of 1 nm or smaller is achieved, as shown in FIG. 9A.

Figure 9B:
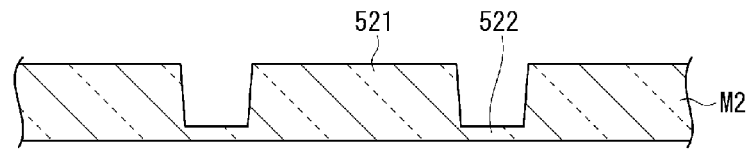

A Cr/Au layer is then formed on a surface of the second glass substrate M2, and the Cr/Au layer is used as an etching mask, for example, in a fluorinated-acid-based (such as BHF-based) etching process to etch away an area above an area corresponding to the holding portion 522. The Cr/Au layer used as the etching mask is then removed. The second glass substrate M2 having the complete substrate shape of the second substrate 52 is thus manufactured, as shown in FIG. 9B.

In the present embodiment, a plurality of second substrates 52 are formed from the single second glass substrate M2. To this end, the etching in the step described above is so performed on the second glass substrate M2 that a plurality of second substrates 52 are manufactured in the form of an array in which they are arranged side by side.

Figure 9C:
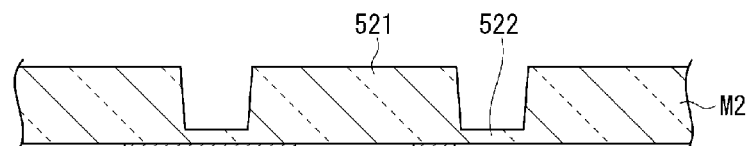

The movable electrode 562 and the movable drawn electrode 564A are then formed, as shown in FIG. 9C. In the formation of the movable electrode 562 and the movable drawn electrode 564A, the same method used in the formation of the fixed electrode 561 on the first substrate 51 described above can be used.

Figure 9D:
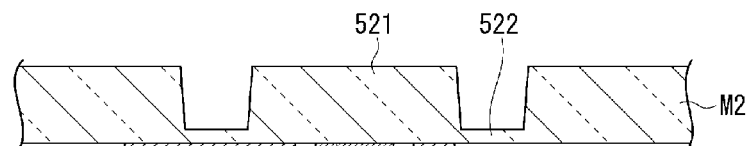

The movable reflection film 55 is then formed on the movable surface 521A, as shown in FIG. 9D. The movable reflection film 55 can also be formed by using the same method used in the formation of the fixed reflection film 54.

The second glass substrate M2 on which a plurality of second substrates 52 are arranged in the form of an array is thus manufactured.

Third Substrate Formation Step

The third substrate formation step S3 will be described next.

In the third substrate formation step S3, both surfaces of the third glass substrate (1.0 mm thick, for example) are polished with precision until a surface roughness Ra of 1 nm or smaller is achieved.

Etching is then performed with a mask covering the surface of the third glass substrate where the sidewall portion 532 is formed. The third glass substrate having the complete substrate shape including the top surface portion 531 and the sidewall portion 532 is thus manufactured.

The third glass substrate is then cut on a chip basis, for example, in a laser cutting process. The third substrate 53 is thus manufactured.

Substrate Bonding Step

Figure 10A:
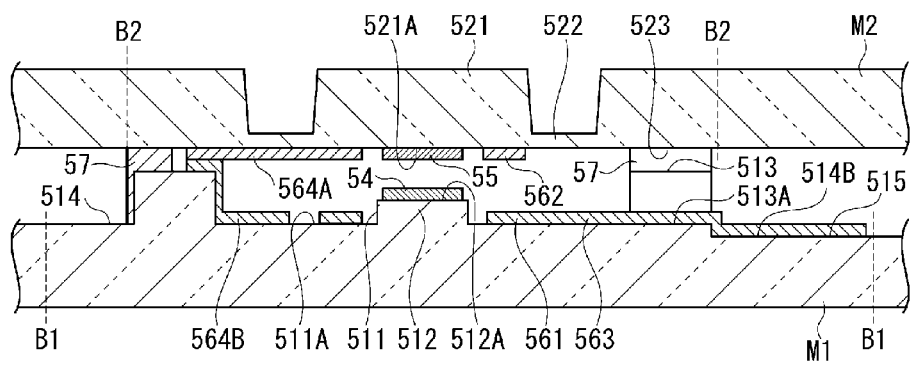
FIGS. 10A to 10C show a substrate bonding step shown in FIG. 7.
Figure 10B:
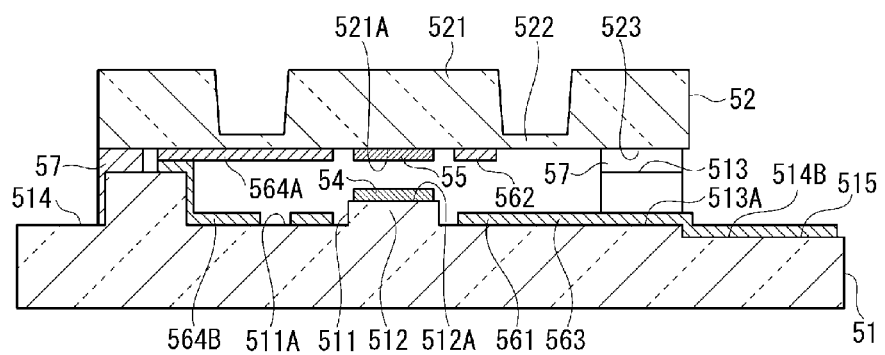
Figure 10C:
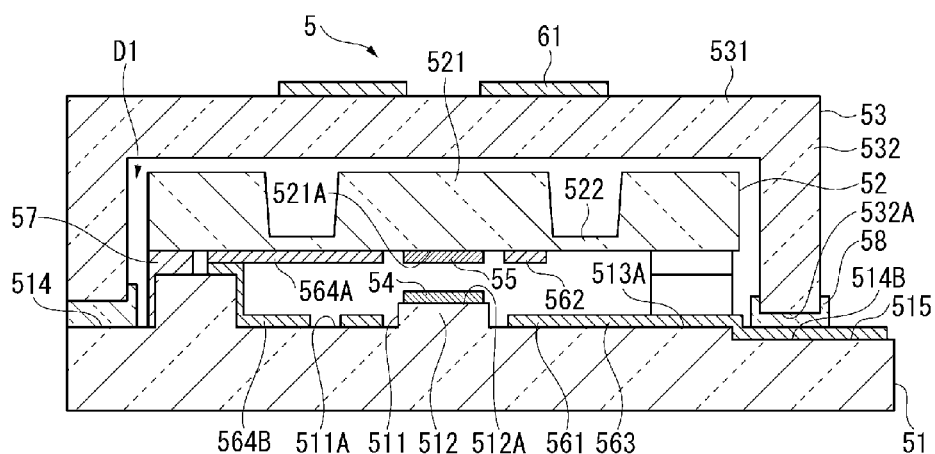

The substrate bonding step S4 will be described next. FIGS. 10A to 10C show a variety of states of the first glass substrate M1 and the second glass substrate M2 in the substrate bonding step S4.

In the substrate bonding step S4, a plasma polymerization film primarily made of polyorganosiloxane (bonding film 57) is first formed on the bonding portion 513 of the first glass substrate M1 and the bonding portion 523 of the second glass substrate M2, for example, in a plasma CVD process. The thickness of each of the bonding films 57 may range, for example, from 10 to 1000 nm.

$O_2$ plasma processing or UV processing is then performed on the plasma polymerization films on the first glass substrate M1 and the second glass substrate M2 to add activation energy to the plasma polymerization films. In the case of $O_2$ plasma processing, it is performed for 30 seconds under the following conditions: The flow rate of $O_2$ is $1.8 \times 10^{-3}$ (m³/h); the pressure is 27 Pa; and the RF power is 200 W. On the other hand, in the case of UV processing, it is performed for 3 minutes by using excimer UV light (having a wavelength of 172 nm) as an UV light source.

After activation energy is added to the plasma polymerization films, the first glass substrate M1 and the second glass substrate M2 are aligned with each other, and the first glass substrate M1 and the second glass substrate M2 are layered on each other via the plasma polymerization films, followed by application of a load of 98 (N) or any other suitable value to the bonded portion for 10 minutes. As a result, the first glass substrate M1 and the second glass substrate M2 are bonded to each other, as shown in FIG. 10A (gap formation step).

A cutting step of separating the first substrate 51 and the second substrate 52 from the glass substrates on a chip basis is then carried out. Specifically, the first glass substrate M1 is cut along lines B1. Further, the second glass substrate M2 is cut along lines B2, the intervals between which are narrower than those between the lines B1 when viewed in the thickness direction of the first glass substrate M1 and the second glass substrate M2 on in a plan view. The first glass substrate M1 may be first cut and the second glass substrate M2 may then be cut, or vice versa. The cutting can be performed, for example, by using scribe breaking or laser cutting. As a result, a bonded structure in which the first substrate 51 and the second substrate 52 are bonded to each other is thus formed, as shown in FIG. 10B.

The bonded structure is then placed in a vacuum environment, for example, accommodated in a vacuum chamber. With this state maintained, a bonding step of bonding the third substrate 53 to the first substrate 51 is carried out. In the bonding step, the bonding member 58, which is made of low melting glass in the form of paste, is first applied onto the bonding portion 514 of the first substrate 51. As a result, the electrode drawing grooves 514B are filled with the bonding member 58, which comes in intimate contact with the fixed drawn electrode 563 and the movable drawn electrode 564B disposed in the electrode drawing grooves 514B.

Thereafter, the bonded structure described above and the third substrate 53 are aligned with each other so that the end surface 532A of the sidewall portion 532 of the third substrate 53 is placed on the bonding portion 514 of the first substrate 51 via the bonding member 58. In this process, since the depth of the electrode drawing grooves 514B is equal to the thickness of the fixed drawn electrode 563 and the movable drawn electrode 564B, the upper surfaces of the fixed drawn electrode 563 and the movable drawn electrode 564B in the electrode drawing grooves 514B are flush with the bonding portion 514.

Further, pressing the third substrate 53 against the first substrate 51 causes the bonding member 58 to be pushed out along the curved surfaces 514D of each of the electrode drawing grooves 514B. As a result, the bonding member 58 flows as desired also along the boundaries (corner portions) between the fixed drawn electrode 563 and the corresponding electrode drawing groove 514B and between the movable drawn electrode 564B and the corresponding electrode drawing groove 514B and comes into intimate contact with the corner portions for improved hermetical bonding. The bonding member 58 is then dried and baked.

The first substrate 51 and the third substrate 53 are thus bonded to each other (bonding step), as shown in FIG. 10C. The bonded structure allows the space D1 to be hermetically sealed in a vacuum state.

The wavelength tunable interference filter 5 is thus manufactured.

Advantageous Effects of First Embodiment

In the wavelength tunable interference filter 5 according to the present embodiment, the fixed drawn electrode 563 and the movable drawn electrode 564B pass through the bonding member 58 and extend both inside and outside the hermetically sealed space D1.

As a result, the fixed electrode pad 563P and the movable electrode pad 564P extending out of the hermetically sealed space D1 can apply a voltage to the fixed electrode 561 and the movable electrode 562. Further, since the space D1 can be hermetically sealed on a chip basis, unlike a configuration in which a wavelength tunable interference filter is accommodated in an enclosure having an interior maintained in a hermetically sealed state, the size of the wavelength tunable interference filter 5 can be reduced.

Further, since the movable electrode 562 provided on the second substrate 52 is drawn by the movable drawn electrode 564B provided on the first substrate 51, wiring lines for drawing purposes can all be placed on the first substrate 51, whereby the wavelength tunable interference filter 5 is readily wired. Moreover, since the fixed electrode pad 563P and the movable electrode pad 564P are both placed on the pad attachment portion 515, an FPC (flexible printed circuit) or any other component only needs to be connected to the pad attachment portion 515 in a wiring process, whereby the manufacturing cost can be lowered.

In the wavelength tunable interference filter 5 according to the present embodiment, the electrode drawing grooves 514B are provided in the bonding portion 514 so that the electrode drawing grooves 514B face the end surface 532A of the sidewall portion 532, and the fixed drawn electrode 563 and the movable drawn electrode 564B extend along the electrode drawing grooves 514B.

As a result, the stepped portion formed between the surfaces of the fixed drawn electrode 563 and the movable drawn electrode 564B and the bonding portion 514 is smaller than a stepped portion in a case where no electrode drawing groove 514B is formed, or the surfaces of the fixed drawn electrode 563 and the movable drawn electrode 564B are lower than the bonding portion 514. The structure described above prevents the third substrate 53 from being inclined and hence the end surface 532A can be bonded to the first substrate 51 with no gap therebetween, whereby the space D1 can be more reliably hermetically sealed. In the present embodiment, in particular, since the depth of the electrode drawing grooves 514B is equal to the thickness of the fixed drawn electrode 563 and the movable drawn electrode 564B, the surfaces of the fixed drawn electrode 563 and the movable drawn electrode 564B are flush with the bonding portion 514, which prevents the third substrate 53 from being inclined more reliably, whereby the space D1 can be further hermetically sealed.

In the wavelength tunable interference filter 5 according to the present embodiment, the bonding member 58 is made of low melting glass.

Since low melting glass fills a gap in a highly satisfactory manner, the end surface 532A can be bonded to the bonding portion 514 with no gap therebetween even in the portion through which the fixed drawn electrode 563 and the movable drawn electrode 564B pass, whereby the space D1 can be more reliably hermetically sealed.

In the wavelength tunable interference filter 5 according to the present embodiment, each of the electrode drawing grooves 514B has the bottom surface 514C, which is parallel to the bonding portion 514, and the curved surfaces 514D, which connect the bottom surface 514D to the bonding portion 514.

As a result, when the first substrate 51 and the third substrate 53 are bonded to each other, the bonding member 58 in the form of paste flows along the curved surfaces 514D toward both ends of each of the fixed drawn electrode 563 and the movable drawn electrode 564B disposed on the bottom surfaces 514C. As a result, the bonding member 58 fills the corner portions formed by both edges of each of the electrodes and the bottom surface 514C with no gap, which prevents air bubbles or gaps from being produced in the bonding member 58, whereby the space D1 can be more reliably hermetically sealed.

Second Embodiment

A second embodiment of the invention will be described next with reference to the drawings.

Figure 11:
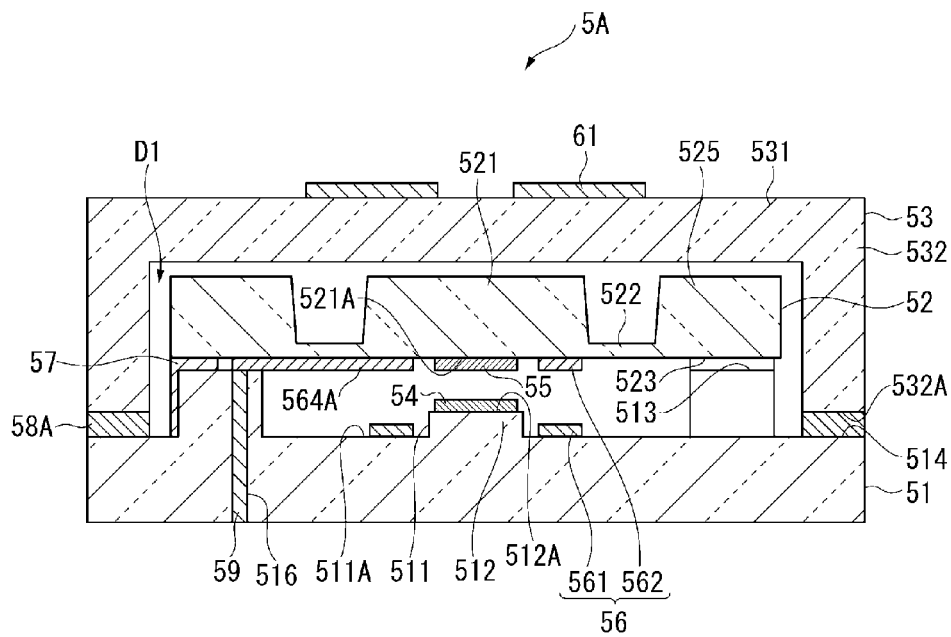
FIG. 11 is a cross-sectional view of a wavelength tunable interference filter of a second embodiment according to the invention.

FIG. 11 is a cross-sectional view of a wavelength tunable interference filter 5A in the second embodiment.

In the wavelength tunable interference filter 5A, a wiring hole 516 is provided in the first substrate 51 and passes through the bonding portion 513 and the surface of the first substrate 51 that faces away from the surface facing the second substrate 52 (rear surface of first substrate 51).

In the present embodiment, no movable drawn electrode 564B is provided on the first substrate 51. Further, the fixed drawn electrode 563 (although not shown) does not extend out of the space D1 but extends along a side surface of the electrode placement groove 511 to the bonding portion 513.

A through electrode 59 is provided in the wiring hole 516. The through electrode 59 is provided, for example, at two locations. On the bonding portion 513, one of the through electrodes 59 is connected to the movable drawn electrode 564A, and the other through electrode 59 is connected to the fixed drawn electrode 563. The through electrodes 59 correspond to the wiring portion according to an embodiment of the invention.

The ends of the through electrodes 59 that are exposed through the rear surface of the first substrate 51 function as a movable electrode terminal and a fixed electrode terminal that are connected to the voltage controller 15. The first substrate 51 is therefore provided with no pad attachment portion 515 in the present embodiment.

Further, the end surface 532A of the sidewall portion 532 of the third substrate 53 is bonded to the bonding portion 514 of the first substrate 51 via a bonding member 58A made of Au, Ni, or any other metal material. The other configurations are the same as those of the wavelength tunable interference filter 5 in the first embodiment.

The through electrodes 59 can be formed, for example, by filling the wiring holes with a metal core material (such as tungsten, iron-nickel alloy, and molybdenum) when the first glass substrate M1 is processed. The through electrodes 59 can instead be formed by forming wiring holes in the first glass substrate M1 by using a laser or a drill and filling the wiring holes with Cu or any other plating material. In this process, the plating material that spills out of the wiring holes is removed, for example, in a polishing process.

Further, when the wavelength tunable interference filter 5A is manufactured, in a substrate formation step of forming each of the first substrate 51 and the third substrate 53, a metal film pattern is formed on each of the bonding portion 514 of the first substrate 51 and the end surface 532A of the sidewall portion 532 of the third substrate 53. When the first substrate 51 and the third substrate 53 are bonded to each other, Ar plasma processing is performed on the surface of each of the metal films to activate it, and the metal films are then caused to come into intimate contact with each other under a load so that they are bonded to each other. The metal films may instead be bonded to each other in a fusion process.

In the wavelength tunable interference filter 5A according to the present embodiment, the through electrodes 59, which are connected to the fixed drawn electrode 563 and the movable drawn electrode 564A, pass through the first substrate 51 and extend both inside and outside the hermetically sealed space D1.

A voltage can therefore be applied through the ends of the through electrodes 59 that are exposed through the rear surface of the first substrate 51 to the fixed electrode 561 and the movable electrode 562. Further, since the space D1 can be hermetically sealed on a chip basis, the size of the wavelength tunable interference filter 5A can be reduced as compared with a configuration in which a wavelength tunable interference filter is accommodated in an enclosure having an interior maintained in a hermetically sealed state.

Moreover, since the wiring lines are drawn from the interior of the space D1 to the exterior thereof, the first substrate 51 needs to be provided with no pad attachment portion, whereby the size of the first substrate 51 and hence the size of the wavelength tunable interference filter 5A can be further reduced.

In the wavelength tunable interference filter 5A according to the present embodiment, the end surface 532A of the sidewall portion 532 and the bonding portion 514 are bonded to each other in a metal bonding process in which the metal films provided on both sides are bonded to each other.

As a result, the end surface 532A and the bonding portion 514 can be more securely bonded to each other, whereby the space D1 can be more reliably hermetically sealed. Further, since no gas producing material, such as an adhesive, is used, the vacuum state in the space D1 can be maintained, whereas when the space D1 is filled with an inert gas or any other predetermined gas, the space D1 will not be contaminated with any other gas.

Third Embodiment

A third embodiment of the invention will be described next with reference to the drawings.

Figure 12:
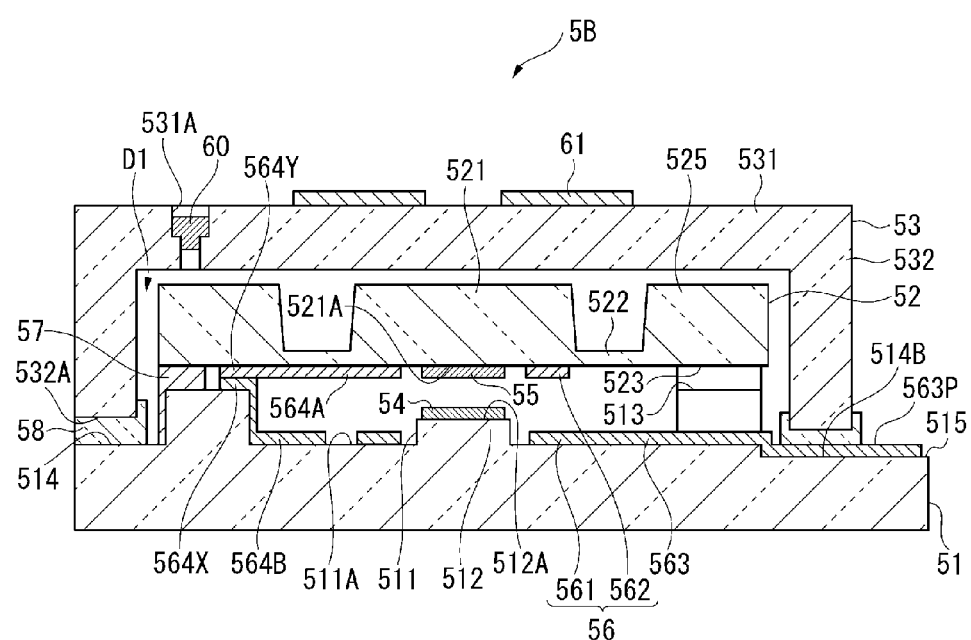
FIG. 12 is a cross-sectional view of a wavelength tunable interference filter of a third embodiment according to the invention.

FIG. 12 is a cross-sectional view of a wavelength tunable interference filter 5B in the third embodiment.

In the wavelength tunable interference filter 5B, a through hole 531A, which passes through the top surface portion 531 of the third substrate 53, is provided in the top surface portion 531. The through hole 531A communicates with the space D1. The through hole 531A is filled with a sealing member 60 made of AuGe or any other metal material. The sealing member 60 hermetically seals the space D1. The other configurations are the same as those of the wavelength tunable interference filter 5 according to the first embodiment.

Figure 13A:
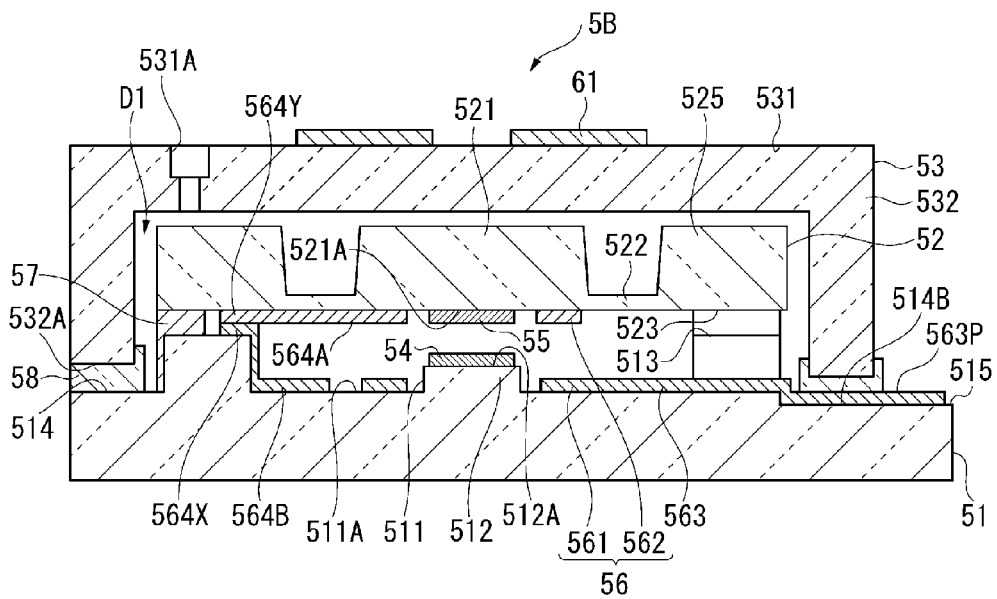
FIGS. 13A and 13B show a substrate bonding step in the present embodiment.
Figure 13B:
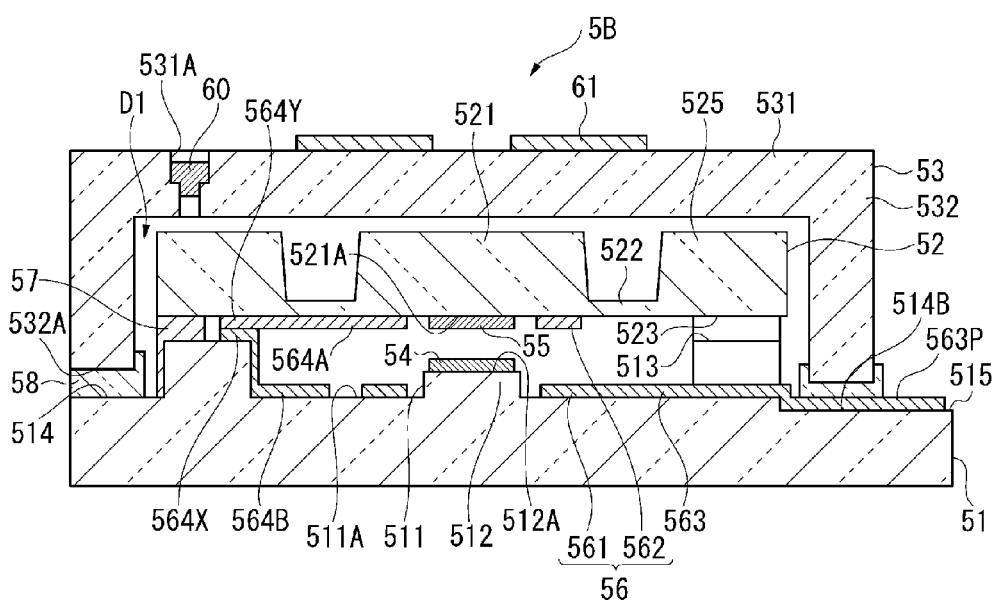

FIGS. 13A and 13B show a substrate bonding step in the third embodiment.

When the wavelength tunable interference filter 5B is manufactured, the through hole 531A is provided in the third substrate 53 before the first substrate 51 and the third substrate 53 are bonded to each other. An Au film or any other film is formed on the inner surface of the through hole 531A. At this point, no sealing member 60 is provided in the through hole 531A.

The first substrate 51 and the third substrate 53 with the through hole 531A provided therein are then bonded to each other in the atmospheric environment, as shown in FIG. 13A.

Any gas in the space D1 is then removed through the through hole 531A in a vacuum drawing process. Further, in the vacuum drawing process, a metal ball is disposed in the through hole 531A, and the metal ball is caused to melt, for example, by using a laser beam and the like to form the sealing member 60, with which the through hole 531A is filled, as shown in FIG. 13B. The space D1 is thus hermetically sealed with the vacuum state maintained.

The configuration and the manufacturing method described above are also applicable to the wavelength tunable interference filter 5A according to the second embodiment.

According to the wavelength tunable interference filter 5B of the present embodiment, the step of bonding the first substrate 51 and the third substrate 53 to each other can be carried out in the atmospheric environment instead of in a vacuum chamber, whereby the manufacturing steps can be simplified. Further, for example, even when the end surface 532A of the sidewall portion 532 is bonded to the bonding portion 514 with an adhesive, and the space D1 is contaminated with gasses produced by the adhesive, the gasses can be readily removed.

Fourth Embodiment

A fourth embodiment of the invention will be described next with reference to the drawings.

Figure 14:
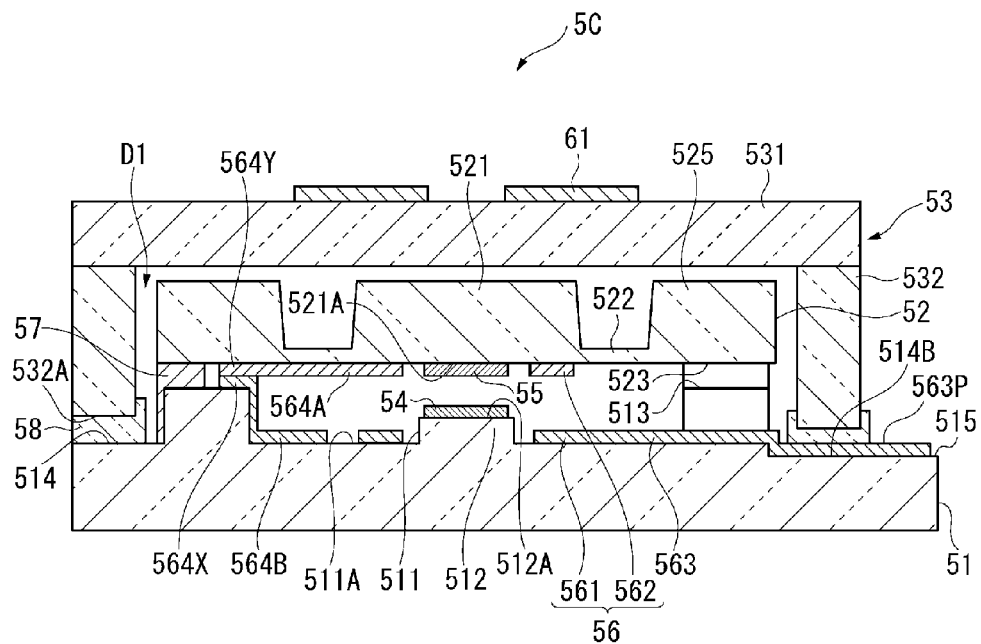
FIG. 14 is a cross-sectional view of a wavelength tunable interference filter of a fourth embodiment according to the invention.

FIG. 14 is a cross-sectional view of a wavelength tunable interference filter 5C in the fourth embodiment.

In the wavelength tunable interference filter 5C, the top surface portion 531 and the sidewall portion 532 of the third substrate 53 are separate members. The other configurations are the same as those of the wavelength tunable interference filter 5 according to the first embodiment.

In the present embodiment, the top surface portion 531 and the sidewall portion 532 of the third substrate 53 are made of the same material of which the first substrate 51 is made. The coefficient of thermal expansion of the top surface portion 531 and the sidewall portion 532 can thus be equal to that of the first substrate 51, whereby deformation of the top surface portion 531 and the first substrate 51 due to thermal expansion can be suppressed. Light incident on the top surface portion 531 or the first substrate 51 can thus be appropriately separated for transmission of the separated light.

According to the wavelength tunable interference filter 5C of the present embodiment, the top surface portion 531 and the sidewall portion 532 can be formed separately. In this case, for example, the manufacturing period can be shortened, as compared with a case where the top surface portion 531 and the sidewall portion 532 are formed by etching a single substrate. Further, the surface flatness of the top surface portion 531 can be increased, whereby refraction and scattering of light incident on the top surface portion 531 can be suppressed and hence the incident light is allowed to pass through appropriately. Moreover, the aperture 61 formed on the top surface portion 531 is readily formed on the other surface of the top surface portion 531 instead of on the surface shown in FIG. 14, that is, the surface in contact with the space D1. Forming the aperture 61 on the surface in contact with the space D1 or in a position closer to the fixed reflection film 54 and the movable reflection film 55 desirably further prevents light having passed through the area where no fixed reflection film 54 or movable reflection film 55 is present from forming stray light.

Further, in the fourth embodiment described above, the top surface portion 531 may be made of borosilicate glass, and the sidewall portion 532 may be made of silicon. In this case, the top surface portion 531 and the sidewall portion 532 can be bonded to each other in an anodic bonding process, whereby the top surface portion 531 and the sidewall portion 532 can be more securely bonded to each other. Moreover, when the first substrate 51 is made of borosilicate glass, the sidewall portion 532 can be bonded to the first substrate 51 in an anodic bonding process, whereby the sidewall portion 532 can be more securely bonded to the first substrate 51.

Further, in the fourth embodiment described above, the top surface portion 531 may be made of glass, and the sidewall portion 532 may be made of a metal. In this case, the sidewall portion 532 can be bonded to the first substrate 51 in a metal bonding process without separate formation of a metal film on the end surface 532A of the sidewall portion 532, whereby the manufacturing steps can be simplified. In this case, a metal film is formed on the portion of the top surface portion 531 that is bonded to the sidewall portion 532.

Other Embodiments

The invention is not limited to the embodiments described above, and changes, improvements, and other modifications are encompassed in the scope of the invention.

Figure 15:
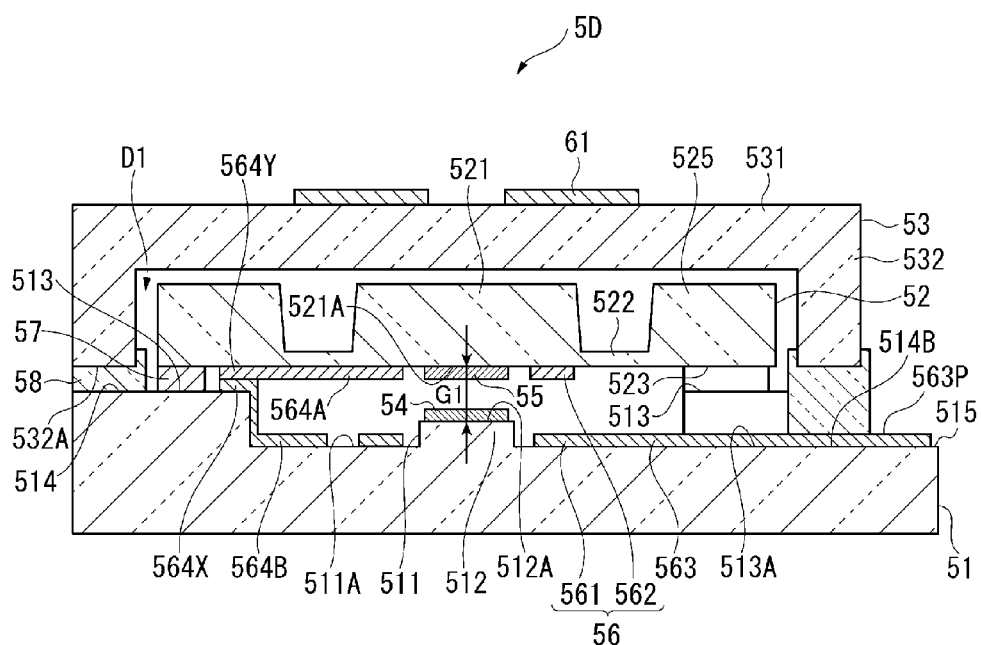
FIG. 15 is a cross-sectional view of a wavelength tunable interference filter according to another embodiment.

For example, in the embodiments described above, the bonding portion 513 and the bonding portion 514 have different flat surfaces at different levels. The bonding portion 513 and the bonding portion 514 may instead be flush with each other, as shown in a wavelength tunable interference filter 5D in FIG. 15. Further, in this configuration, the pad attachment portion 515 may be flush with the bottom surfaces of the electrode placement surface 511A and the electrode drawing grooves 513A. In this case, the number of etchings or the period thereof can be reduced in the first substrate formation step, whereby the manufacturing cost can be lowered.

In the embodiments described above, the movable drawn electrode 564B extends along the side surface of the electrode placement groove 511 to the bonding portion 513 and is connected to the movable drawn electrode 564A on the bonding portion 513. The movable drawn electrode 564B may instead be connected to the movable drawn electrode 564A via a conductive paste disposed in the electrode placement groove 511.

In the step of bonding the first substrate 51 and the third substrate 53 to each other in the embodiments described above, after the first glass substrate M1 and the second glass substrate M2 are bonded to each other, the second glass substrate M2 may be cut, for example, in a dry etching process, and the third substrate 53 may then be bonded to the first substrate 51 having undergone no cutting process. In this case, the step of bonding the third substrate 53 can also be a wafer-based process, whereby the manufacturing steps can be simplified.

In the first embodiment described above, the bonding member 58 is made of low melting glass, but the bonding member 58 may instead be an adhesive made of a resin as long as the space D1 can be maintained hermetic.

In the second embodiment described above, the bonding member 58A is made of a metal, but the bonding member 58A may be made of low melting glass. Further, the bonding member 58A may be an adhesive made of a resin or a siloxane polymerization film as long as the space D1 can be maintained hermetic.

In the third embodiment described above, the through hole 531A is provided in the top surface portion 531 of the third substrate 53, but the through hole 531A may instead be provided in the sidewall portion 532 or the first substrate 51.

In the embodiments described above, the electrostatic actuator 56 formed of the fixed electrode 561 and the movable electrode 562 changes the dimension of the inter-reflection-film gap G1 by way of example, but the electrostatic actuator does not necessarily have the above configuration.

For example, a first induction coil provided on the first substrate 51 and a second induction coil or a permanent magnet provided on the second substrate 52 may form the electrostatic actuator.

Further, the electrostatic actuator 56 may be replaced with a piezoelectric actuator. In this case, for example, a lower electrode layer, a piezoelectric film, and an upper electrode layer are stacked on each other and disposed at the holding portion 522, and a voltage applied between the lower electrode layer and the upper electrode layer is changed as an input value to expand or contract the piezoelectric film so as to bend the holding portion 522.

Moreover, the configuration in which the size of the inter-reflection-film gap G1 is changed based on voltage application is not necessarily employed. For example, the size of the inter-reflection-film gap G1 can be adjusted by changing the air pressure between the first substrate 51 and the second substrate 52 with respect to the air pressure outside the wavelength tunable interference filter 5.

In each of the embodiments described above, the spectrometric measurement apparatus 1 is presented as the electronic apparatus according to an embodiment of the invention by way of example. The wavelength tunable interference filter 5, the optical module, and the electronic apparatus according to the embodiments of the invention are applicable to a variety of fields as well as the example described above.

Figure 16:
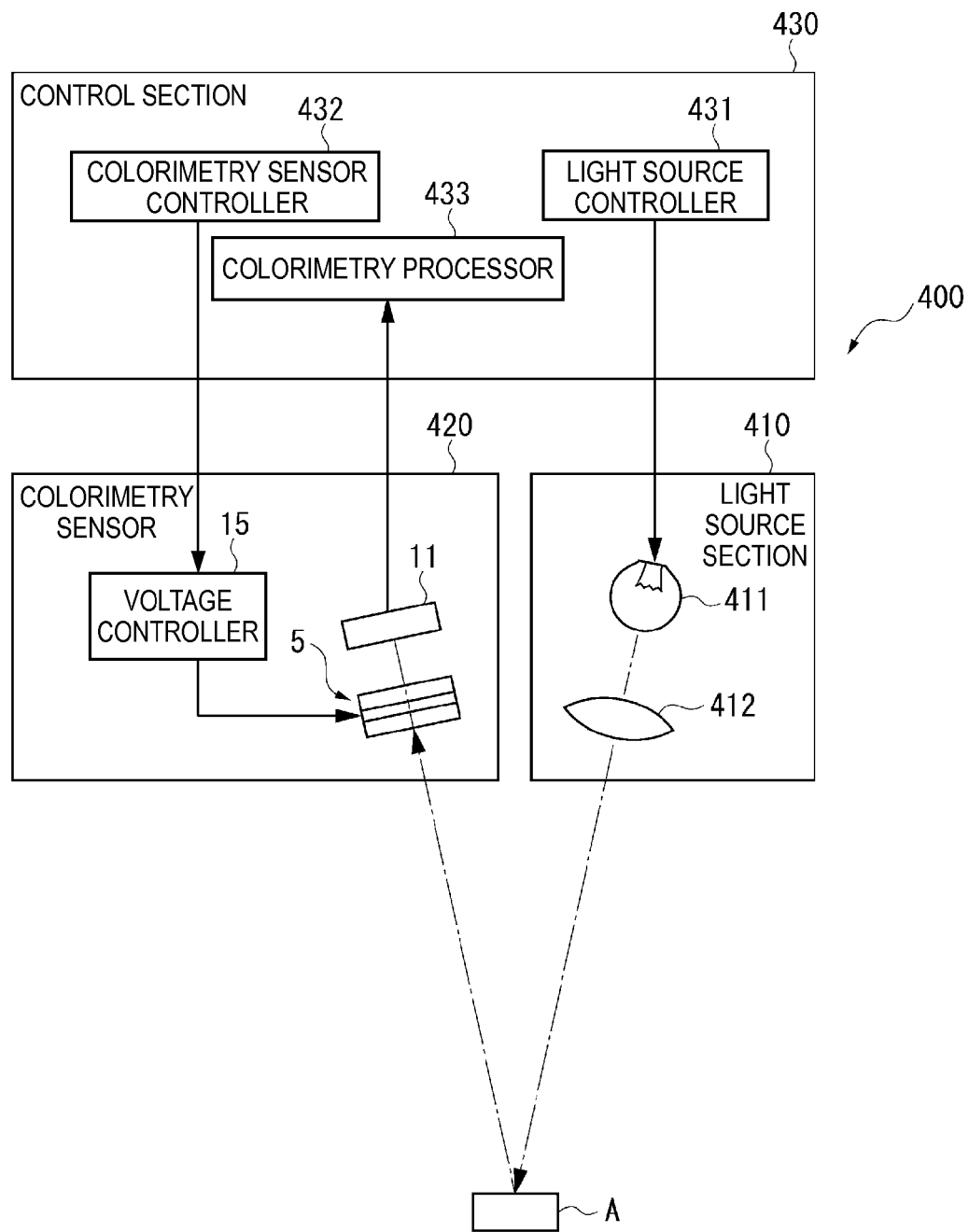
FIG. 16 is a block diagram showing an example of a colorimetry apparatus as an electronic apparatus according to an embodiment of the invention.

For example, the electronic apparatus according to the embodiments of the invention is applicable to a colorimetry apparatus for color measurement, as shown in FIG. 16.

FIG. 16 is a block diagram showing an example of a colorimetry apparatus 400 including the wavelength tunable interference filter 5.

The colorimetry apparatus 400 includes a light source section 410, which outputs light toward an object A under inspection, a colorimetry sensor 420 (optical module), and a control section 430 (control unit), which controls overall action of the colorimetry apparatus 400, as shown in FIG. 16. The colorimetry apparatus 400 operates as follows: The light outputted from the light source section 410 is reflected off the object A under inspection; the colorimetry sensor 420 receives the reflected light under inspection; and the chromaticity of the light under inspection, that is, the color of the object A under inspection is analyzed and measured based on a detection signal outputted from the colorimetry sensor 420.

The light source section 410 includes alight source 411 and a plurality of lenses 412 (FIG. 16 shows only one of them) and outputs, for example, reference light (white light, for example) toward the objet A under inspection. The plurality of lenses 412 may include a collimator lens. In this case, in the light source section 410, the collimator lens parallelizes the reference light emitted from the light source 411 and outputs the parallelized reference light through a projection lens (not shown) toward the objet A under inspection. In the present embodiment, the colorimetry apparatus 400 including the light source section 410 is presented by way of example, and the light source section 410 may not be provided, for example, when the objet A under inspection is a liquid crystal panel or any other light emitting member.

The colorimetry sensor 420 includes the wavelength tunable interference filter 5, the detector 11, which receives the light having passed through the wavelength tunable interference filter 5, and the voltage controller 15, which controls the voltage applied to the electrostatic actuator 56 in the wavelength tunable interference filter 5, as shown in FIG. 16. The colorimetry sensor 420 further includes an optical lens for incident light (not shown) that is located a position facing the wavelength tunable interference filter 5 and guides the reflected light reflected off the objet A under inspection (light under inspection) into the colorimetry sensor 420. In the colorimetry sensor 420, the wavelength tunable interference filter 5 separates light of a predetermined wavelength from the light under inspection incident through the optical lens for incident light and the detector 11 receives the separated light.

The control section 430 is the control unit in an embodiment of the invention and controls overall action of the colorimetry apparatus 400.

The control section 430 can, for example, be a general-purpose personal computer, a personal digital assistant, or a computer dedicated for colorimetry. The control section 430 includes a light source controller 431, a colorimetry sensor controller 432, and a colorimetry processor 433, as shown in FIG. 16.

The light source controller 431 is connected to the light source section 410 and outputs a predetermined control signal based, for example, on a user's setting input to cause the light source section 410 to emit white light of predetermined luminance.

The colorimetry sensor controller 432 is connected to the colorimetry sensor 420 and sets the wavelength of light to be received by the colorimetry sensor 420 based, for example, on a user's setting input and outputs an instruction signal to the colorimetry sensor 420 to cause the colorimetry sensor 420 to detect the amount of light of the thus set wavelength. The voltage controller 15 in the colorimetry sensor 420 then applies a voltage to the electrostatic actuator 56 based on the control signal to drive the wavelength tunable interference filter 5.

The colorimetry processor 433 analyzes the chromaticity of the objet A under inspection based on the received amount of light detected with the detector 11. The colorimetry processor 433 may instead analyze the chromaticity of the objet A under inspection by using the amount of light obtained from the detector 11 as a measured spectrum D and estimating an optical spectrum S by using an estimated matrix Ms, as in the first embodiment described above.

Another example of the electronic apparatus according to the embodiments of the invention may be a light-based system for detecting presence of a specific substance. Examples of such a system may include an on-vehicle gas leakage detector that employs a spectrometric measurement method using the wavelength tunable interference filter 5 according to any of the embodiments of the invention, an optoacoustic rare gas detector for respiratory detection, and other gas detection apparatus.

An example of such a gas detection apparatus will be described below with reference to the drawings.

Figure 17:
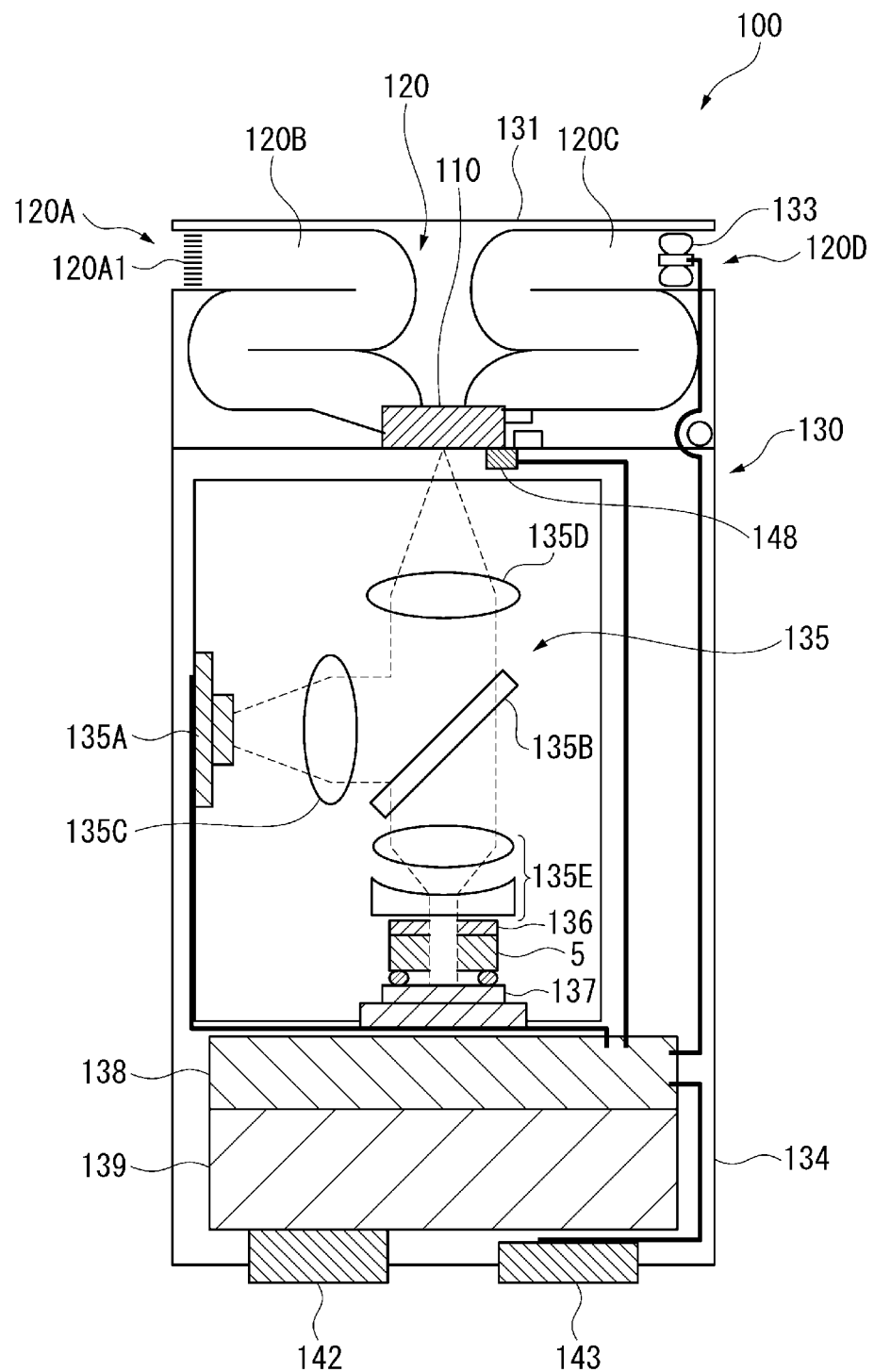
FIG. 17 is a schematic view showing an example of a gas detection apparatus as an electronic apparatus according to an embodiment of the invention.

FIG. 17 is a schematic view showing an example of a gas detection apparatus including the wavelength tunable interference filter 5.

Figure 18:
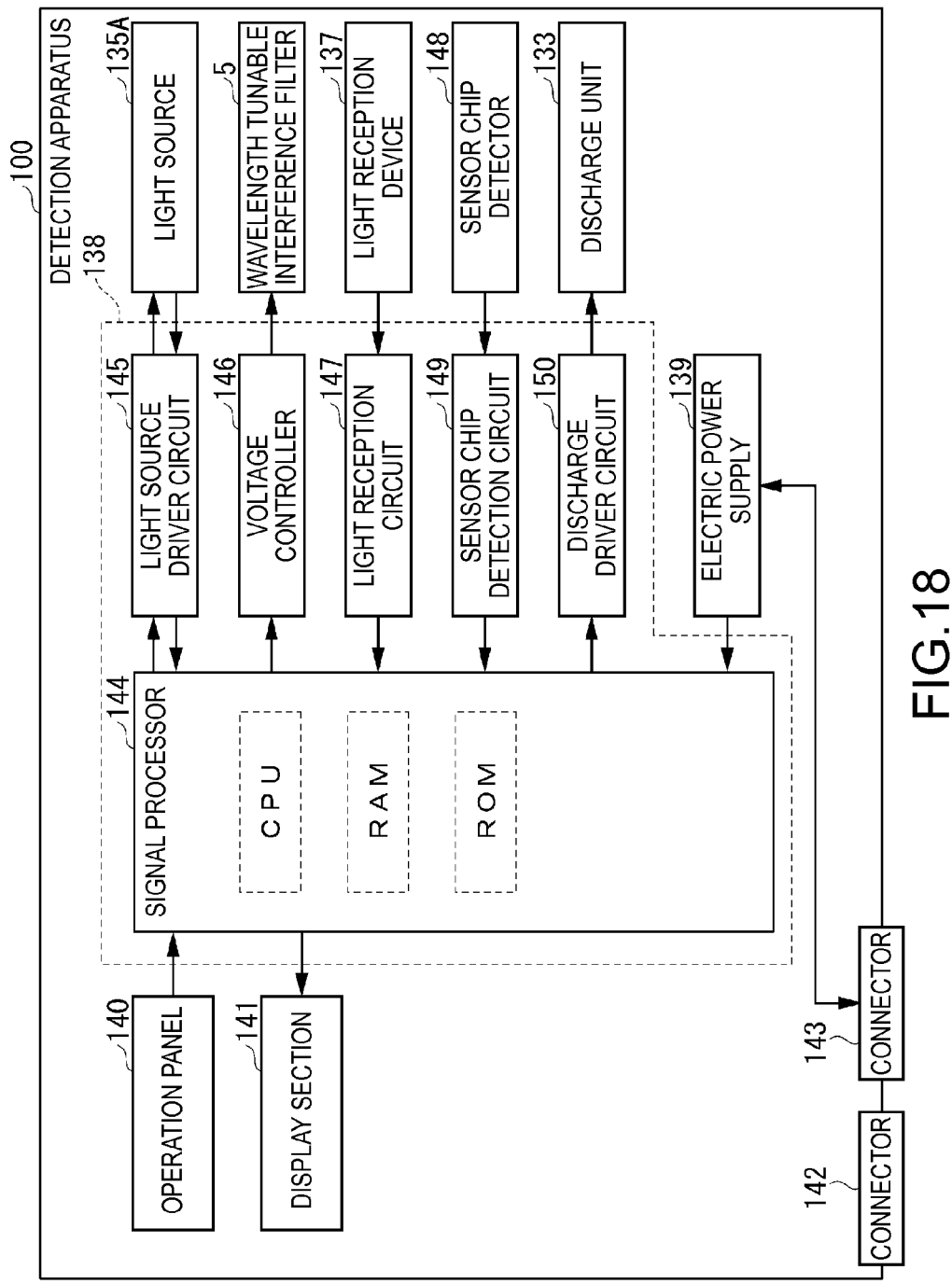
FIG. 18 is a block diagram showing the configuration of a control system of the gas detection apparatus shown in FIG. 17.

FIG. 18 is a block diagram showing the configuration of a control system of the gas detection apparatus shown in FIG. 17.

A gas detection apparatus 100 includes a sensor chip 110, a channel 120 having a suction port 120A, a suction channel 120B, a discharge channel 120C, and a discharge port 120D, and a main body 130, as shown in FIG. 17.

The main body 130 includes a sensor unit cover 131 having an aperture through which the channel 120 can be attached and detached, a discharge unit 133, an enclosure 134, an optical unit 135, a filter 136, the wavelength tunable interference filter 5, a detection unit including a light reception device 137 (detector), a control unit 138, which processes a detected signal and controls the detector, and an electric power supply 139, which supplies electric power. The optical unit 135 includes a light source 135A, which emits light, a beam splitter 135B, which reflects the light incident from the light source 135A toward the sensor chip 110 whereas transmitting light incident from the sensor chip side toward the light reception device 137, and lenses 135C, 135D, and 135E.

On the exterior surface of the gas detection apparatus 100 are provided an operation panel 140, a display section 141, a connector 142 for external interfacing, and the electric power supply 139, as shown in FIG. 18. When the electric power supply 139 is a secondary battery, a connector 143 for charging purposes may be further provided.

Further, the control unit 138 in the gas detection apparatus 100 includes a signal processor 144, which is formed, for example, of a CPU, alight source driver circuit 145, which controls the light source 135A, a voltage controller 146, which controls the wavelength tunable interference filter 5, alight reception circuit 147, which receives a signal from the light reception device 137, a sensor chip detection circuit 149, which receives a signal from a sensor chip detector 148, which reads a code of the sensor chip 110 and detects whether or not the sensor chip 110 is present, and a discharge driver circuit 150, which controls the discharge unit 133, as shown in FIG. 18. The gas detection apparatus 100 further includes a storage section (not shown) that stores the V-λ data.

The action of the thus configured gas detection apparatus 100 will be described next.

The sensor chip detector 148 is disposed inside the sensor unit cover 131 in an upper portion of the main body 130, and the sensor chip detector 148 detects whether or not the sensor chip 110 is present. The signal processor 144, when it detects a detection signal from the sensor chip detector 148, judges that the sensor chip 110 has been attached and provides the display section 141 with a display signal that causes the display section 141 to display information representing that detection action is ready.

For example, when a user operates the operation panel 140 and the operation panel 140 outputs an instruction signal representing start of detection to the signal processor 144, the signal processor 144 first outputs a light source activation signal to the light source driver circuit 145 to activate the light source 135A. Having been driven, the light source 135A emits single-wavelength, linearly polarized, stable laser light. Further, the light source 135A has a built-in temperature sensor and light amount sensor, which output information on the temperature and the amount of light to the signal processor 144. When the signal processor 144 judges that the light source 135A is operating in a stable manner based on the temperature and the amount of light inputted from the light source 135A, the signal processor 144 controls the discharge driver circuit 150 to activate the discharge unit 133. As a result, a gaseous specimen containing a target substance to be detected (gas molecule) is guided through the suction port 120A through the suction channel 120B, the sensor chip 110, and the discharge channel 120C to the discharge port 120D. The suction port 120A is provided with a dust removal filter 120A1, which removes relatively large dust, part of water vapor, and other substances.

The sensor chip 110 is a sensor that has a plurality of metal nano-structures incorporated therein and operates based on localized surface plasmon resonance. In the thus configured sensor chip 110, laser light incident thereon forms an enhanced electric field among the metal nano-structures. When a gas molecule enters the enhanced electric field, Raman scattered light carrying information on molecular vibration and Rayleigh scattered light are produced.

The Rayleigh scattered light and the Raman scattered light are incident through the optical unit 135 on the filter 136, which separates the Rayleigh scattered light out, and the Raman scattered light is incident on the wavelength tunable interference filter 5. The signal processor 144 then outputs a control signal to the voltage controller 146. The voltage controller 146 then reads a voltage value corresponding to the wavelength under measurement from the storage section and applies the voltage to the electrostatic actuator 56 in the wavelength tunable interference filter 5 to cause the wavelength tunable interference filter 5 to separate Raman scattered light corresponding to the gas molecule under detection, as described in the above first embodiment. Thereafter, having received the separated light, the light reception device 137 outputs a light reception signal according to the amount of received light to the signal processor 144 via the light reception circuit 147. In this case, target Raman scattered light can be precisely extracted through the wavelength tunable interference filter 5.

The signal processor 144 compares data on the spectrum of the thus obtained Raman scattered light corresponding to the gas molecule under detection with data stored in a ROM and judges whether or not the detected gas molecule is the target gas molecule to identify the substance. The signal processor 144 further displays information on the result of the identification on the display section 141 and outputs the information via the connector 142 to an external apparatus.

In FIGS. 17 and 18 described above, the gas detection apparatus 100, which performs gas detection based on Raman scattered light separated from initial Raman scattered light by the wavelength tunable interference filter 5, is presented byway of example, but a gas detection apparatus that identifies the type of gas by detecting the absorbance specific to the gas may instead be used. In this case, a gas sensor that receives a gas flowing therein, separates light absorbed by the gas from incident light, and detects the separated light is used as the optical module according to an embodiment of the invention. A gas detection apparatus including the gas sensor that analyzes and identifies a gas that flows into the sensor can be considered as an electronic apparatus according to an embodiment of the invention. The configuration described above also allows gas component detection by using the wavelength tunable interference filter 5.

The system for detecting presence of a specific substance is not limited to the gas detection system described above. Another systems for detecting presence of a specific substance can, for example, be a substance composition analyzer, such as a noninvasive measurement apparatus for measuring sugars based on near-infrared spectrometry and a noninvasive measurement apparatus for acquiring information on food, biological body, mineral, and other substances.

A food analyzer will be described below as an example of the substance composition analyzer described above.

Figure 19:
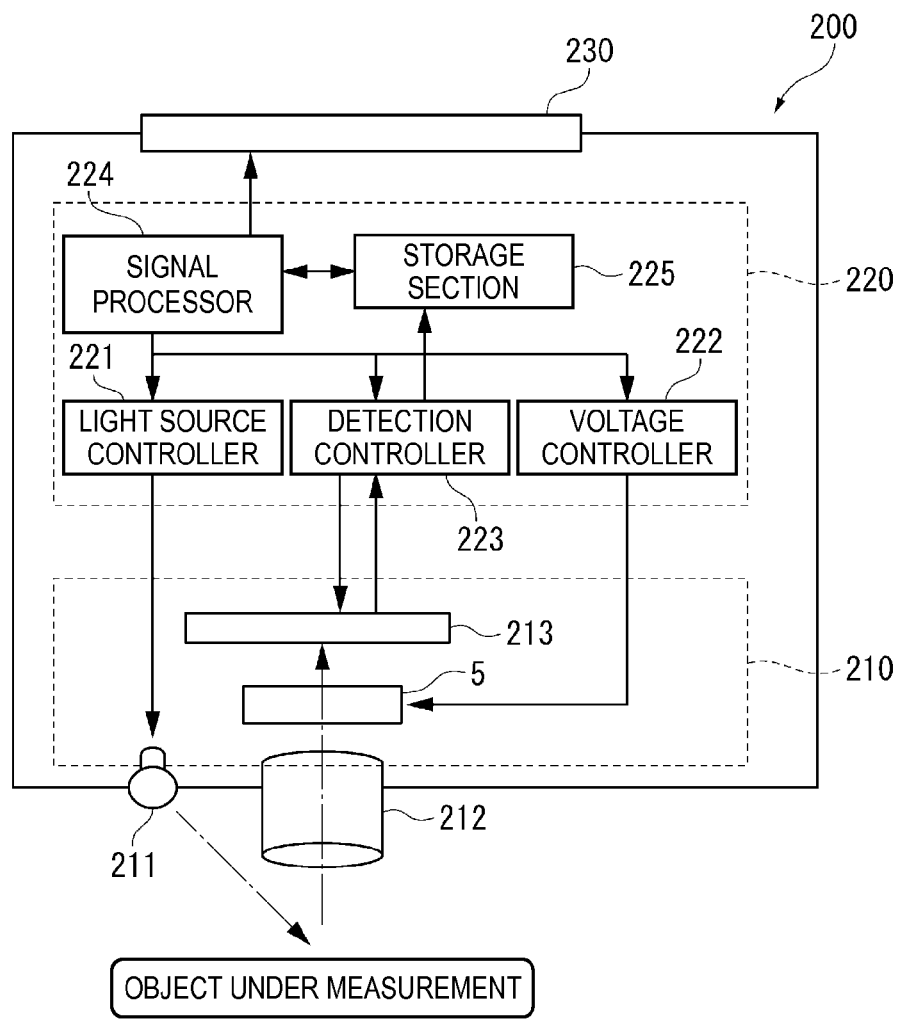
FIG. 19 shows a schematic configuration of a food analyzer as an electronic apparatus according to an embodiment of the invention.

FIG. 19 shows a schematic configuration of a food analyzer that is an example of the electronic apparatus using the wavelength tunable interference filter 5.

A food analyzer 200 includes a detection unit 210 (optical module), a control unit 220, and a display unit 230, as shown in FIG. 19. The detection unit 210 includes a light source 211, which emits light, an imaging lens 212, which introduces light from an object under measurement, the wavelength tunable interference filter 5, which separates the light introduced through the imaging lens 212, and an imager 213 (detector), which detects the separated light.

The control unit 220 includes alight controller 221, which performs light-on/off control on the light source 211 and luminance control when the light source 211 is emitting light, a voltage controller 222, which controls the wavelength tunable interference filter 5, a detection controller 223, which controls the imager 213 and acquires a spectrometric image captured with the imager 213, a signal processor 224, and a storage section 225.

In the food analyzer 200, when the system thereof is driven, the light source controller 221 controls the light source 211 to cause it to emit light toward an object under measurement. Light reflected off the object under measurement then passes through the imaging lens 212 and enters the wavelength tunable interference filter 5. The wavelength tunable interference filter 5 is driven under the control of the voltage controller 222. The wavelength tunable interference filter 5 can thus precisely extracts light of a target wavelength. The extracted light is then captured as an image with the imager 213 formed, for example, of a CCD camera. The captured image light is accumulated as a spectrometric image in the storage section 225. The signal processor 224 controls the voltage controller 222 to change the value of the voltage applied to the wavelength tunable interference filter 5 to acquire spectrometric images of a variety of wavelengths.

The signal processor 224 then computes data from the pixels of each of the images accumulated in the storage section 225 to determine a spectrum at each of the pixels. The storage section 225 further stores, for example, information on the composition of food corresponding to a spectrum, and the signal processor 224 analyzes data on the determined spectra based on the information on food stored in the storage section 225 to determine food components contained in the object under detection and the contents of the food components. Further, the calorie, the degree of freshness, and other factors of the food can be calculated based on the resultant food components and contents thereof. Moreover, the spectral distribution in each image can be analyzed, for example, to extract a portion of the food under inspection where freshness has lowered, and even foreign matter and other undesirable objects contained in the food can be detected.

The signal processor 224 then displays information on the thus obtained components, contents, calorie, freshness, and other factors of the food under inspection on the display unit 230.

In addition to the example of the food analyzer 200 shown FIG. 19, and substantially the same configuration can be used as noninvasive measurement apparatus described above that measure other types of information. For example, a bioanalyzer that analyzes biological components, for example, measures and analyzes blood or other bodily fluid components, can be provided. A bioanalyzer of this type, for example, an apparatus that measures blood and other bodily fluid components, can be an apparatus that senses ethyl alcohol, which can be used as a drunk-driving prevention apparatus that detects the state of a drunk driver. Further, an electronic endoscope system including a bioanalyzer of this type can be provided.

Moreover, a mineral analyzer that analyzes mineral components can be provided.

Further, the wavelength tunable interference filter, the optical module, and the electronic apparatus according to the embodiments of the invention are applicable to the following apparatus.

For example, changing the intensity of light of a variety of wavelengths over time allows the light of the variety of wavelengths to transmit data. In this case, the wavelength tunable interference filter 5 provided in an optical module separates light of a specific wavelength and a light receiver receives the light for extraction of the data transmitted by the light of the specific wavelength. An electronic apparatus including the data extraction optical module can process the data carried by the light of the variety of wavelengths for optical communication.

Further, an electronic apparatus including the wavelength tunable interference filter according to any of the embodiments of the invention that separates light is applicable to a spectrometric camera that captures a spectrometric image, a spectrometric analyzer, and other apparatus. An example of a spectrometric camera of this type may include an infrared camera in which the wavelength tunable interference filter 5 is incorporated.

Figure 20:
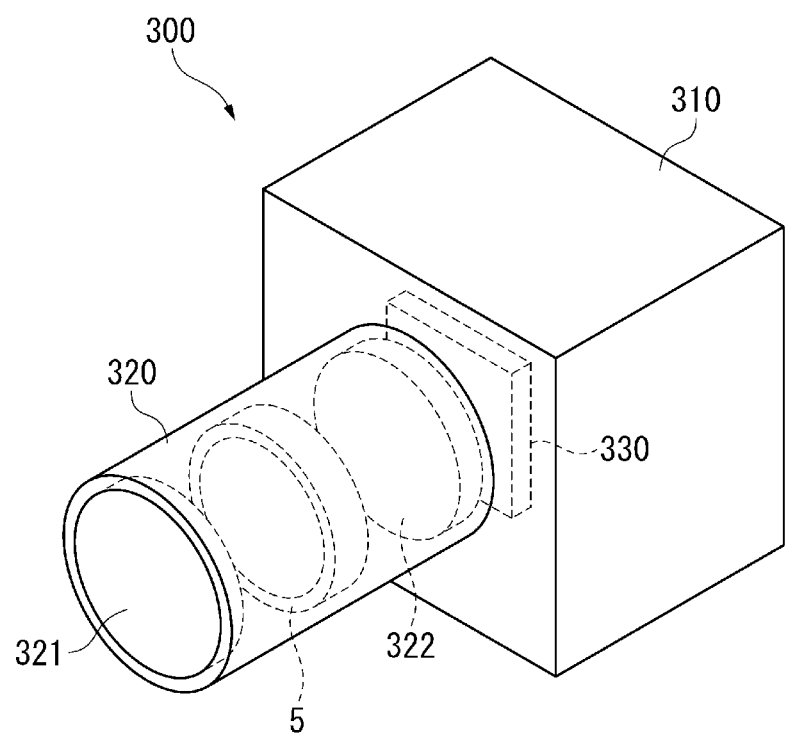
FIG. 20 is a diagrammatic view showing a schematic configuration of a spectrometric camera as an electronic apparatus according to an embodiment of the invention.

FIG. 20 is a diagrammatic view showing a schematic configuration of a spectrometric camera. A spectrometric camera 300 includes a camera body 310, an imaging lens unit 320, and an imager 330 (detector), as shown in FIG. 20.

The camera body 310 is a portion grasped and operated by a user.

The imaging lens unit 320 is attached to the camera body 310 and guides incident image light to the imager 330. The imaging lens unit 320 includes an objective lens 321, an image forming lens 322, and the wavelength tunable interference filter 5 disposed between the two lenses, as shown in FIG. 20.

The imager 330 is formed of a light reception device and captures the image light guided through the imaging lens unit 320.

The thus configured spectrometric camera 300, in which the wavelength tunable interference filter 5 transmits light of a wavelength to be captured as an image, can capture a spectrometric image formed by light of a desired wavelength.

Further, the wavelength tunable interference filter according to any of the embodiments of the invention may be used as a bandpass filter. For example, the wavelength tunable interference filter can be used as an optical laser apparatus in which the wavelength tunable interference filter 5 receives light within a predetermined wavelength region emitted from a light emitting device, separates only narrowband light around a predetermined wavelength, and transmits the separated light.

Moreover, the wavelength tunable interference filter according to any of the embodiments of the invention may be used as a biometrics authentication apparatus. For example, the wavelength tunable interference filter is also applicable to an authentication apparatus based on blood vessels, fingerprints, retina, iris, or any other body part by using near-infrared light or visible light.

Further, the optical module and the electronic apparatus according to the embodiments of the invention can be used as a concentration detection apparatus. In this case, the wavelength tunable interference filter 5 separates infrared energy (infrared light) radiated from an object, and the energy is analyzed for measurement of the concentration of a subject in a sample.

As described above, the wavelength tunable interference filter, the optical module, and the electronic apparatus according to the embodiments of the invention are applicable to any apparatus that separates predetermined light from incident light. Since the wavelength tunable interference filter according to any of the embodiments of the invention can by itself separate light of a plurality of wavelengths from incident light as described above, spectral measurement based on the plurality of wavelengths and detection of a plurality of components can be performed with precision. Each of the optical module and the electronic apparatus has a size further smaller than the size of an apparatus of related art that extracts light of a desired wavelength by using a plurality of devices and can, for example, be preferably used as a portable or on-vehicle optical device.

In addition, the specific structure according to an embodiment of the invention can be changed as appropriate in actual implementation of the invention to any other structure to the extent that the advantage of the invention is achieved.

The entire disclosure of Japanese Patent Application No. 2013-000356 filed on Jan. 7, 2013 is expressly incorporated by reference herein.

What is claimed is:

1. A wavelength tunable interference filter comprising:
a first substrate including a first major surface and an opposing second major surface;
a second substrate facing the first substrate;
a first reflection film provided on the first substrate;
a second reflection film provided on the second substrate so as to face the first reflection film;
a gap changer that changes a dimension of a gap between the first reflection film and the second reflection film;
a wiring portion connected to the gap changer; and
a third substrate having a top surface portion that faces the first substrate and a sidewall portion provided around the top surface portion and directly bonded to the first substrate,
wherein a space surrounded by the top surface portion of the third substrate, the sidewall portion of the third substrate, and the first substrate is hermetically sealed,
the second substrate and the gap changer are disposed in the space,
the wiring portion is disposed on the first major surface of the first substrate and extends continuously along the first major surface from inside the space to outside the space,
the gap changer includes a first electrode provided on the first substrate and a second electrode provided on the second substrate so that the second electrode faces the first electrode,
a connection electrode connected to the second electrode is provided on the second substrate, and
the wiring portion includes a first drawn electrode connected to the first electrode and a second drawn electrode connected to the connection electrode.

2. The wavelength tunable interference filter according to claim 1, further comprising:
a bonding member that is provided between an end surface of the sidewall portion of the third substrate and the first substrate and bonds the end surface to the first substrate,
wherein the wiring portion passes through an area where the bonding member is disposed.

3. The wavelength tunable interference filter according to claim 2,
wherein a groove is provided in the first substrate in a position facing the end surface of the sidewall portion, and the wiring portion extends along the groove.

4. The wavelength tunable interference filter according to claim 2,
wherein the bonding member is made of low melting glass.

5. The wavelength tunable interference filter according to claim 1,
wherein the wiring portion passes through the first substrate and extends from inside the space to outside the space.

6. The wavelength tunable interference filter according to claim 5,
wherein the end surface of the sidewall portion and the first substrate are bonded to each other in a metal bonding process via metal films provided on the end surface and the first substrate.

7. The wavelength tunable interference filter according to claim 5,
wherein the end surface of the sidewall portion and the first substrate are bonded to each other by using low melting glass.

8. The wavelength tunable interference filter according to claim 1,
wherein a through hole is provided in at least one of the first substrate and the third substrate, and
a sealing member that seals the through hole is provided.

9. The wavelength tunable interference filter according to claim 1,
wherein the top surface portion and the sidewall portion are separate portions.

10. The wavelength tunable interference filter according to claim 9,
wherein the top surface portion and the sidewall portion are made of the same material as the first substrate.

11. The wavelength tunable interference filter according to claim 9,
wherein the top surface portion is made of borosilicate glass, and the sidewall portion is made of silicon.

12. The wavelength tunable interference filter according to claim 9,
wherein the top surface portion is made of glass, and the sidewall portion is made of a metal.

13. A method for manufacturing a wavelength tunable interference filter, the method comprising:
a first substrate formation step of forming a first reflection film that reflects part of incident light and transmits another part thereof, a first electrode, and a wiring portion on a first substrate including a first major surface and an opposing second major surface;

a second substrate formation step of forming a second reflection film that reflects part of incident light and transmits another part thereof and a second electrode on a second substrate;

a third substrate formation step of forming a third substrate having a top surface portion and a sidewall portion having a frame shape in a plan view;

a gap formation step of disposing the first substrate and the second substrate so that the first reflection film and the second reflection film face each other and the first electrode and the second electrode face each other; and a bonding step of bonding the first substrate and the third substrate directly to each other, wherein the bonding step includes disposing the first substrate and the third substrate so that the second substrate is located in a space surrounded by the top surface portion, the sidewall portion, and the first substrate and the wiring portion is disposed on the first substrate and extends continuously along the first major surface from inside the space to outside the space and bonding an end surface of the sidewall portion that faces the first substrate to the first substrate to hermetically seal the space, a connection electrode connected to the second electrode is provided on the second substrate, the wiring portion includes a first drawn electrode connected to the first electrode and a second drawn electrode connected to the connection electrode, and the first electrode and the second electrode define a gap changing section that is configured to change a dimension of a gap between the first reflection film and the second reflection film.

14. The method for manufacturing a wavelength tunable interference filter according to claim 13,
wherein the bonding step includes forming a metal film on each of the end surface of the sidewall portion of the third substrate and the first substrate and bonding the formed metal films to each other to bond the end surface and the first substrate to each other.

15. The method for manufacturing a wavelength tunable interference filter according to claim 13,
wherein the bonding step includes bonding the end surface of the sidewall portion of the third substrate and the first substrate to each other by using low melting glass.

16. The method for manufacturing a wavelength tunable interference filter according to claim 13,
wherein the third substrate formation step includes forming a through hole in the third substrate, and
the bonding step includes bonding the end surface of the sidewall portion and the first substrate to each other, then removing a gas in the space through the through hole in a vacuum drawing process, and then sealing the through hole to hermetically seal the space.

17. An optical module comprising:
a first substrate including a first major surface and an opposing second major surface;
a second substrate facing the first substrate;
a first reflection film provided on the first substrate, the first reflection film reflecting part of incident light and transmitting another part thereof;
a second reflection film provided on the second substrate so as to face the first reflection film, the second reflection film reflecting part of incident light and transmitting another part thereof;

a gap changing section that changes a dimension of a gap between the first reflection film and the second reflection film;

a wiring portion connected to the gap changing section;

a third substrate having a top surface portion and a sidewall portion extending from the top surface portion toward the first substrate and having a frame shape in a plan view; and a detector that detects light of a wavelength selected based on interference of light that enters the gap between the first reflection film and the second reflection film, wherein an end surface of the sidewall portion of the third substrate that faces the first substrate is directly bonded to the first substrate so that a space surrounded by the top surface portion of the third substrate, the sidewall portion of the third substrate, and the first substrate is hermetically sealed, the second substrate and the gap changing section are disposed in the space, the wiring portion is disposed on the first major surface of the first substrate and continuously extends along the first major surface from inside the space to outside the space, the gap changing section includes a first electrode provided on the first substrate and a second electrode provided on the second substrate so that the second electrode faces the first electrode, a connection electrode connected to the second electrode is provided on the second substrate, and the wiring portion includes a first drawn electrode connected to the first electrode and a second drawn electrode connected to the connection electrode.

18. An electronic apparatus comprising:
a wavelength tunable interference filter including a first substrate including a first major surface and an opposing second major surface, a second substrate facing the first substrate, a first reflection film provided on the first substrate, the first reflection film reflecting part of incident light and transmitting another part thereof, a second reflection film provided on the second substrate so as to face the first reflection film, the second reflection film reflecting part of incident light and transmitting another part thereof, a gap changing section that changes a dimension of a gap between the first reflection film and the second reflection film, a wiring portion connected to the gap changing section, and a third substrate having a top surface portion and a sidewall portion extending from the top surface portion toward the first substrate and having a frame shape in a plan view; and a control unit that controls the wavelength tunable interference filter, wherein an end surface of the sidewall portion of the third substrate that faces the first substrate is directly bonded to the first substrate so that a space surrounded by the top surface portion of the third substrate, the sidewall portion of the third substrate, and the first substrate is hermetically sealed, the second substrate and the gap changing section are disposed in the space, the wiring portion is disposed on the first major surface of the first substrate and continuously extends along the first major surface from inside the space to outside the space, the gap changing section includes a first electrode provided on the first substrate and a second electrode provided on the second substrate so that the second electrode faces the first electrode, a connection electrode connected to the second electrode is provided on the second substrate, and the wiring portion includes a first drawn electrode connected to the first electrode and a second drawn electrode connected to the connection electrode.

\* \* \* \* \*